US011579073B2

(12) United States Patent
Nassef et al.

(10) Patent No.: US 11,579,073 B2
(45) Date of Patent: Feb. 14, 2023

(54) MICROFLUIDIC SYSTEM WITH COMBINED ELECTRICAL AND OPTICAL DETECTION FOR HIGH ACCURACY PARTICLE SORTING AND METHODS THEREOF

(71) Applicant: Nodexus Inc., Berkeley, CA (US)

(72) Inventors: Hany Nassef, Berkeley, CA (US); Karthik Balakrishnan, Berkeley, CA (US); Anand Kesavaraju, Berkeley, CA (US); Vincent Tuminelli, Berkeley, CA (US); George Anwar, Berkeley, CA (US)

(73) Assignee: NODEXUS INC., Hayward, CA (US)

( * ) Notice: Subject to any disclaimer, the term of this patent is extended or adjusted under 35 U.S.C. 154(b) by 199 days.

(21) Appl. No.: 16/483,922

(22) PCT Filed: Feb. 6, 2018

(86) PCT No.: PCT/US2018/017036
§ 371 (c)(1),
(2) Date: Aug. 6, 2019

(87) PCT Pub. No.: WO2018/148194
PCT Pub. Date: Aug. 16, 2018

(65) Prior Publication Data
US 2020/0096436 A1    Mar. 26, 2020

Related U.S. Application Data

(60) Provisional application No. 62/456,069, filed on Feb. 7, 2017.

(51) Int. Cl.
*G01N 15/14*    (2006.01)
*B01L 3/00*    (2006.01)
(Continued)

(52) U.S. Cl.
CPC .... *G01N 15/1484* (2013.01); *B01L 3/502715* (2013.01); *B01L 3/502761* (2013.01);
(Continued)

(58) Field of Classification Search
CPC .......... G01N 15/1484; G01N 15/1459; G01N 2015/1006; G01N 2015/1081; B01L 3/502715; B01L 3/5027; B07C 5/344
See application file for complete search history.

(56) References Cited

U.S. PATENT DOCUMENTS

| 4,778,657 A | 10/1988 | Spohr |
| 5,653,939 A | 8/1997 | Hollis et al. |

(Continued)

FOREIGN PATENT DOCUMENTS

| EP | 0187663 | 7/1986 |
| EP | 2311975 | 4/2011 |

(Continued)

OTHER PUBLICATIONS

Extended European Search Report dated Jul. 1, 2020 received in related European Patent Application No. 18750818.9 (9 pages).
(Continued)

*Primary Examiner* — Michael McCullough
*Assistant Examiner* — Jessica L Burkman
(74) *Attorney, Agent, or Firm* — Brown Rudnick LLP

(57) ABSTRACT

Disclosed herein is a system to detect and characterize individual particles and cells using at least either optic or electric detection as the particle or cell flows through a microfluidic channel. The system also provides for sorting particles and cells or isolating individual particles and cells.

25 Claims, 33 Drawing Sheets

(51) Int. Cl.
  *B07C 5/342* (2006.01)
  *B07C 5/344* (2006.01)
  *G01N 15/10* (2006.01)

(52) U.S. Cl.
  CPC ............ *B07C 5/344* (2013.01); *B07C 5/3425* (2013.01); *G01N 15/1459* (2013.01); *B01L 2200/0652* (2013.01); *B01L 2300/0627* (2013.01); *B01L 2300/0816* (2013.01); *B01L 2300/0874* (2013.01); *B01L 2400/06* (2013.01); *G01N 2015/1006* (2013.01); *G01N 2015/1081* (2013.01)

(56) References Cited

U.S. PATENT DOCUMENTS

| | | | |
|---|---|---|---|
| 7,279,883 B2 | 10/2007 | Sohn et al. | |
| 7,392,908 B2 | 7/2008 | Frazier | |
| 8,290,625 B2 | 10/2012 | Degeal et al. | |
| 8,820,538 B1 | 9/2014 | Lin | |
| 8,889,072 B2 | 11/2014 | Degeal et al. | |
| 8,894,946 B2 * | 11/2014 | Nielsen | C12Q 1/68 422/417 |
| 9,201,043 B2 | 12/2015 | Sohn et al. | |
| 9,297,784 B2 * | 3/2016 | Molho | B01L 3/502738 |
| 10,101,260 B2 | 10/2018 | Reed et al. | |
| 10,101,261 B2 * | 10/2018 | Takeda | G01N 15/1484 |
| 10,222,317 B2 | 3/2019 | Takeda | |
| 10,267,721 B2 | 4/2019 | Takeda | |
| 10,324,019 B2 | 6/2019 | Diebold et al. | |
| 10,466,160 B2 * | 11/2019 | Handique | G01N 1/20 |
| 10,578,633 B2 * | 3/2020 | West | G01N 33/5005 |
| 10,611,995 B2 | 4/2020 | Masaeli et al. | |
| 10,620,111 B2 | 4/2020 | Diebold et al. | |
| 10,648,899 B2 | 5/2020 | Takeda | |
| 10,650,602 B2 | 5/2020 | You et al. | |
| 2002/0090720 A1 * | 7/2002 | Mutz | G01N 35/1074 435/325 |
| 2002/0140414 A1 | 10/2002 | Sohn et al. | |
| 2003/0032204 A1 | 2/2003 | Walt et al. | |
| 2003/0148531 A1 * | 8/2003 | Hatcher | G01N 15/1404 436/63 |
| 2004/0229349 A1 | 11/2004 | Daridon | |
| 2006/0177348 A1 | 8/2006 | Yasuda et al. | |
| 2006/0286549 A1 | 12/2006 | Sohn et al. | |
| 2007/0059683 A1 | 3/2007 | Barber et al. | |
| 2008/0087585 A1 | 4/2008 | Tyvoll et al. | |
| 2008/0093229 A1 | 4/2008 | Lim et al. | |
| 2008/0317632 A1 | 12/2008 | Shimasaki et al. | |
| 2009/0253181 A1 | 10/2009 | Vangbo et al. | |
| 2010/0099198 A1 | 4/2010 | Zhao et al. | |
| 2010/0221769 A1 | 9/2010 | Lu et al. | |
| 2011/0030808 A1 | 2/2011 | Chiou et al. | |
| 2011/0081674 A1 | 4/2011 | Han et al. | |
| 2011/0287948 A1 | 11/2011 | Suresh et al. | |
| 2017/0128941 A1 * | 5/2017 | Sadri | B01L 3/502738 |
| 2018/0298324 A1 * | 10/2018 | Takeda | C12M 33/04 |
| 2019/0227021 A1 * | 7/2019 | Han | B01L 3/50273 |

FOREIGN PATENT DOCUMENTS

| | | |
|---|---|---|
| JP | 2003-502655 A | 1/2003 |
| JP | 2007-533971 A | 11/2007 |
| KR | 10-0830221 | 5/2008 |
| WO | WO-0078454 A1 | 12/2000 |
| WO | WO-2005/033283 A2 | 4/2005 |
| WO | WO-2005/095935 | 10/2005 |
| WO | WO-2010/07537 A1 | 1/2010 |
| WO | WO-2012/139209 | 10/2012 |
| WO | WO-2013/052890 | 4/2013 |
| WO | WO-2014/150928 | 9/2014 |

OTHER PUBLICATIONS

Balakrishnan, et al., "Node-Pore Sensing Enables Label-Free Surface-Marker Profiling of Single Cells," Analytical Chemistry, 2015, 87 (5), pp. 2988-2995 (8 pages).

Carbonaro et al., "Cell Characterization Using A Protein-Functionalized Pore," Lab on a Chip, vol. 8, No. 9, Jul. 25, 2008, pp. 1478-1485 (8 pages).

Chapman, M.R., etc. "Chapter 6: Label-Free Resistive-Pulse Cytometry," Methods in Cell Biology, vol. 102, Jun. 2011, pp. 127-157 (31 pages).

Office Action, dated Nov. 24, 2021, for Japanese Patent Application No. 2019-563338 (3 total pages).

* cited by examiner

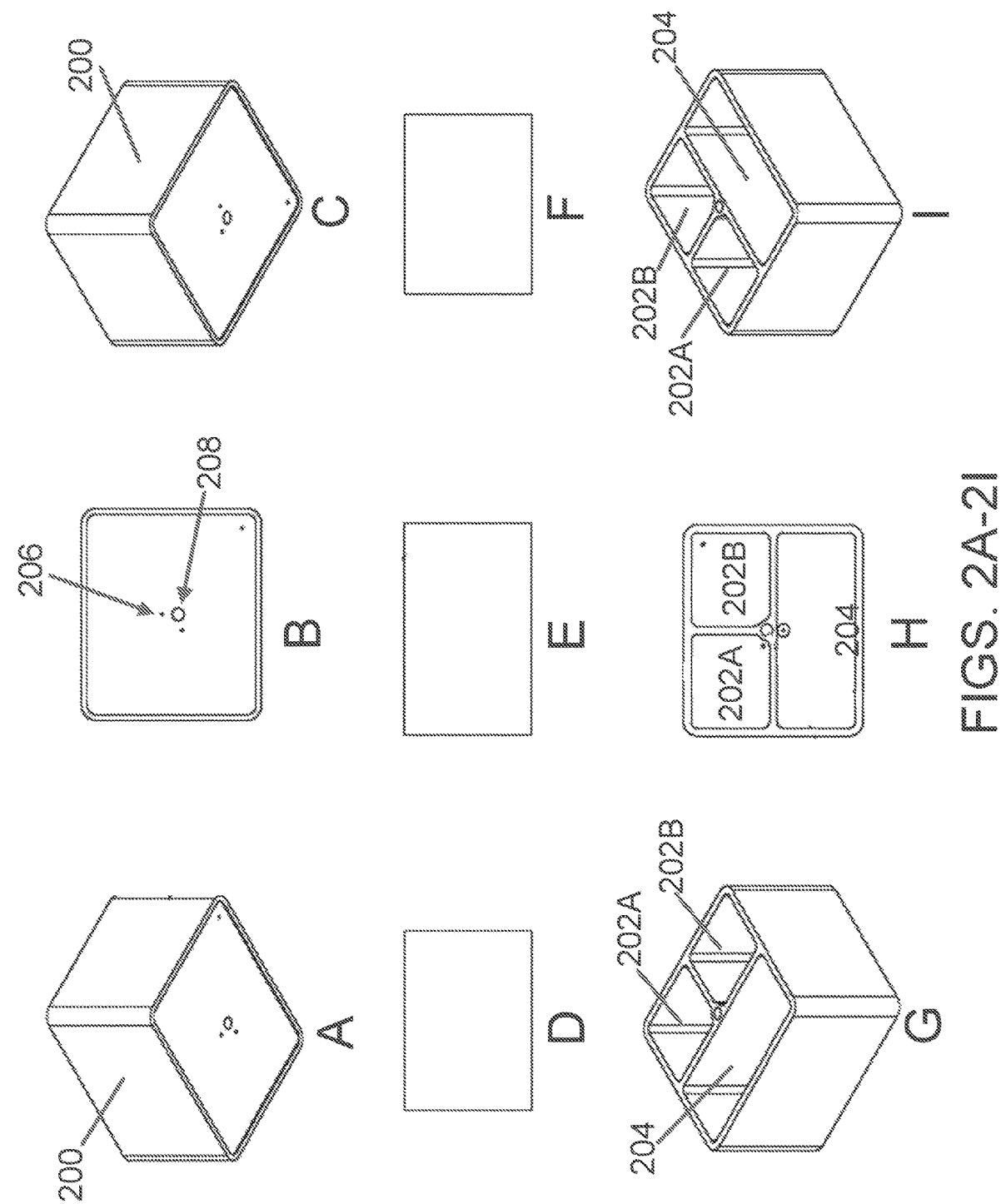

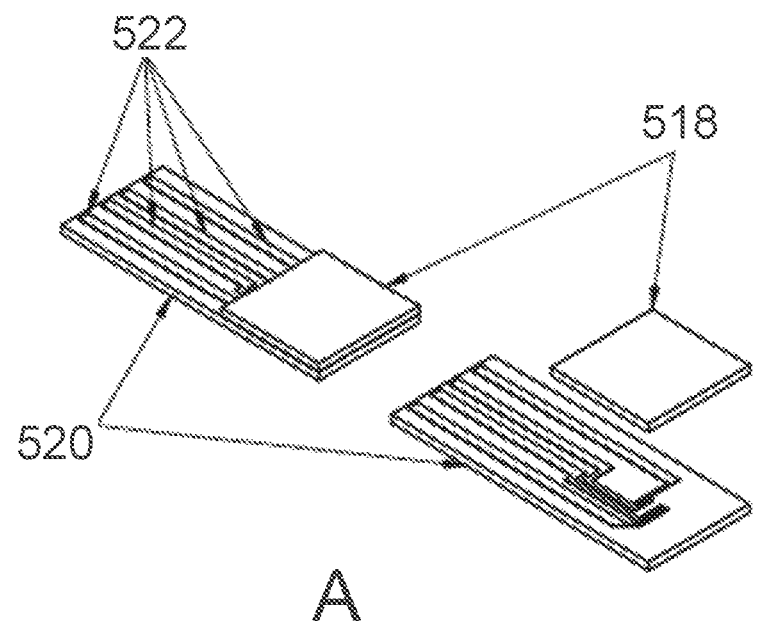
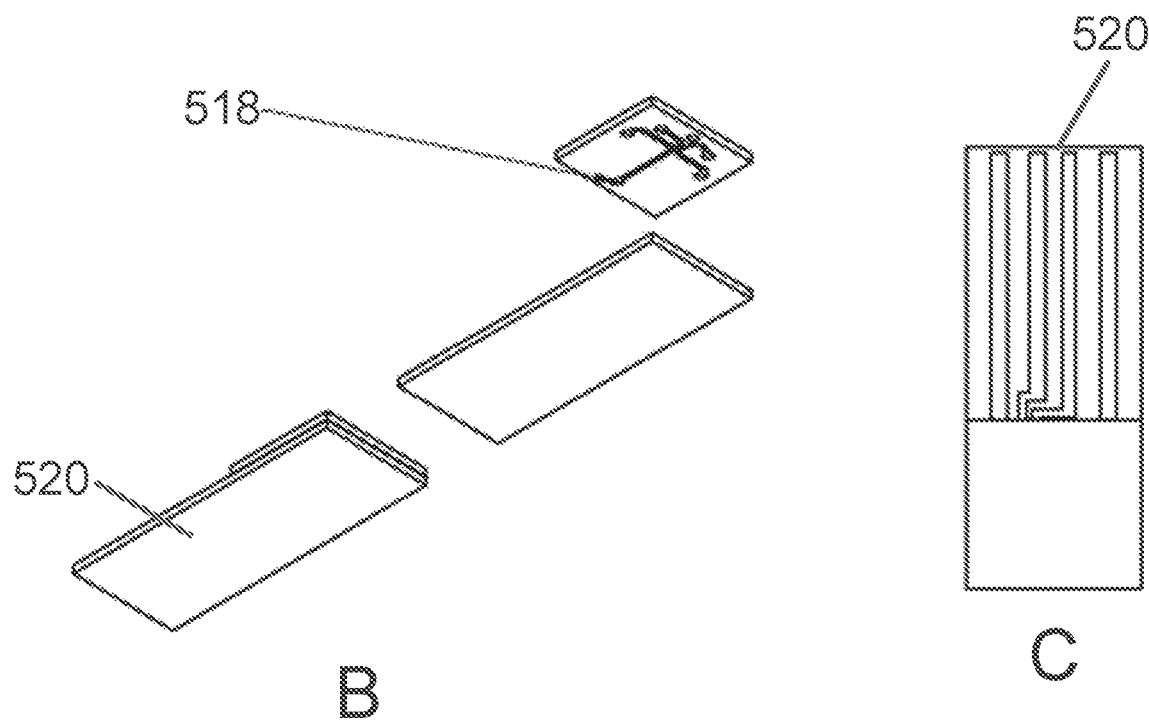
FIGS. 5A-5C

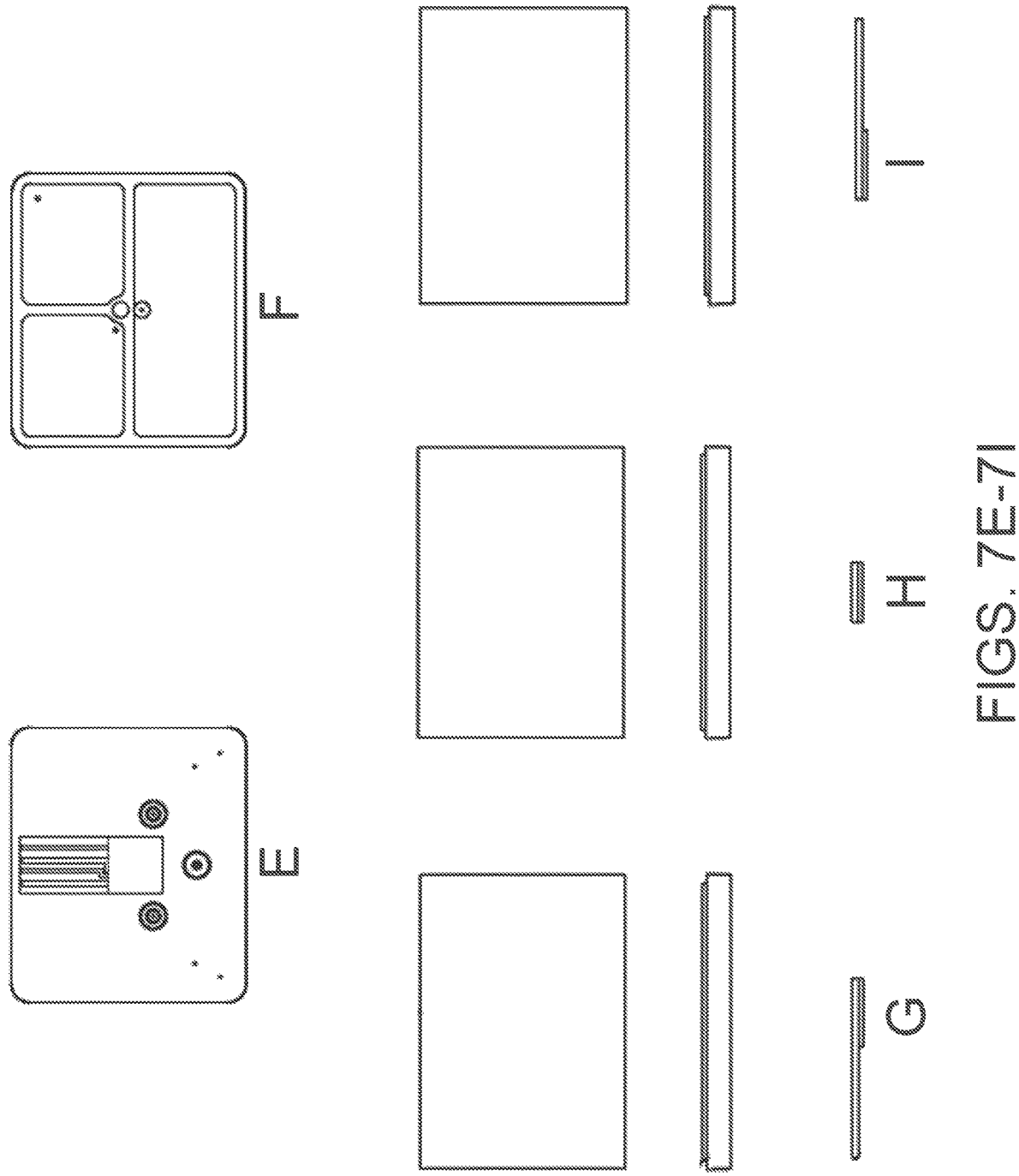

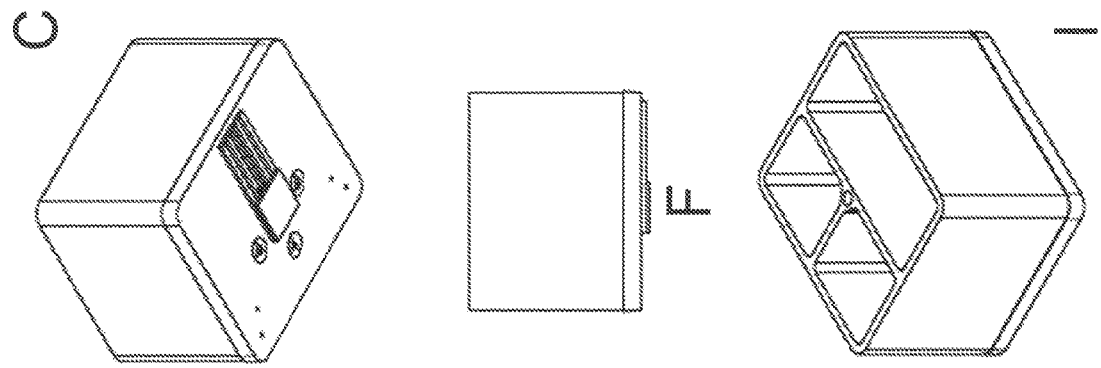
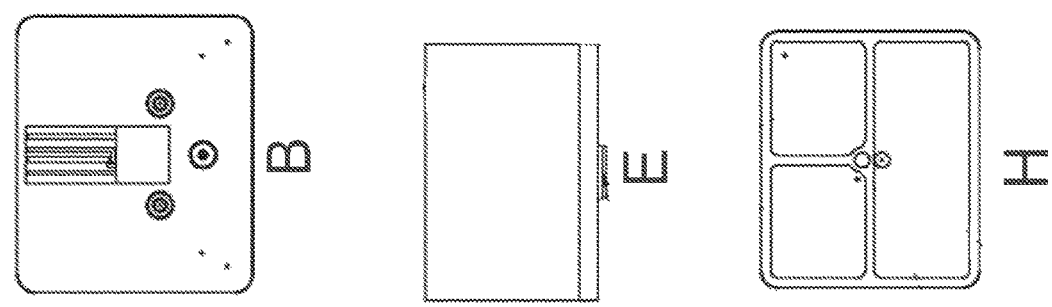
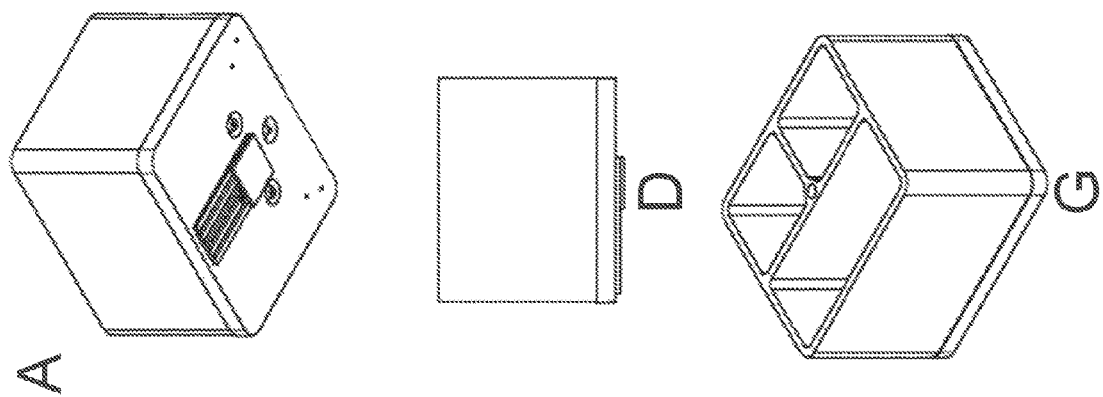
FIGS. 8A-8I

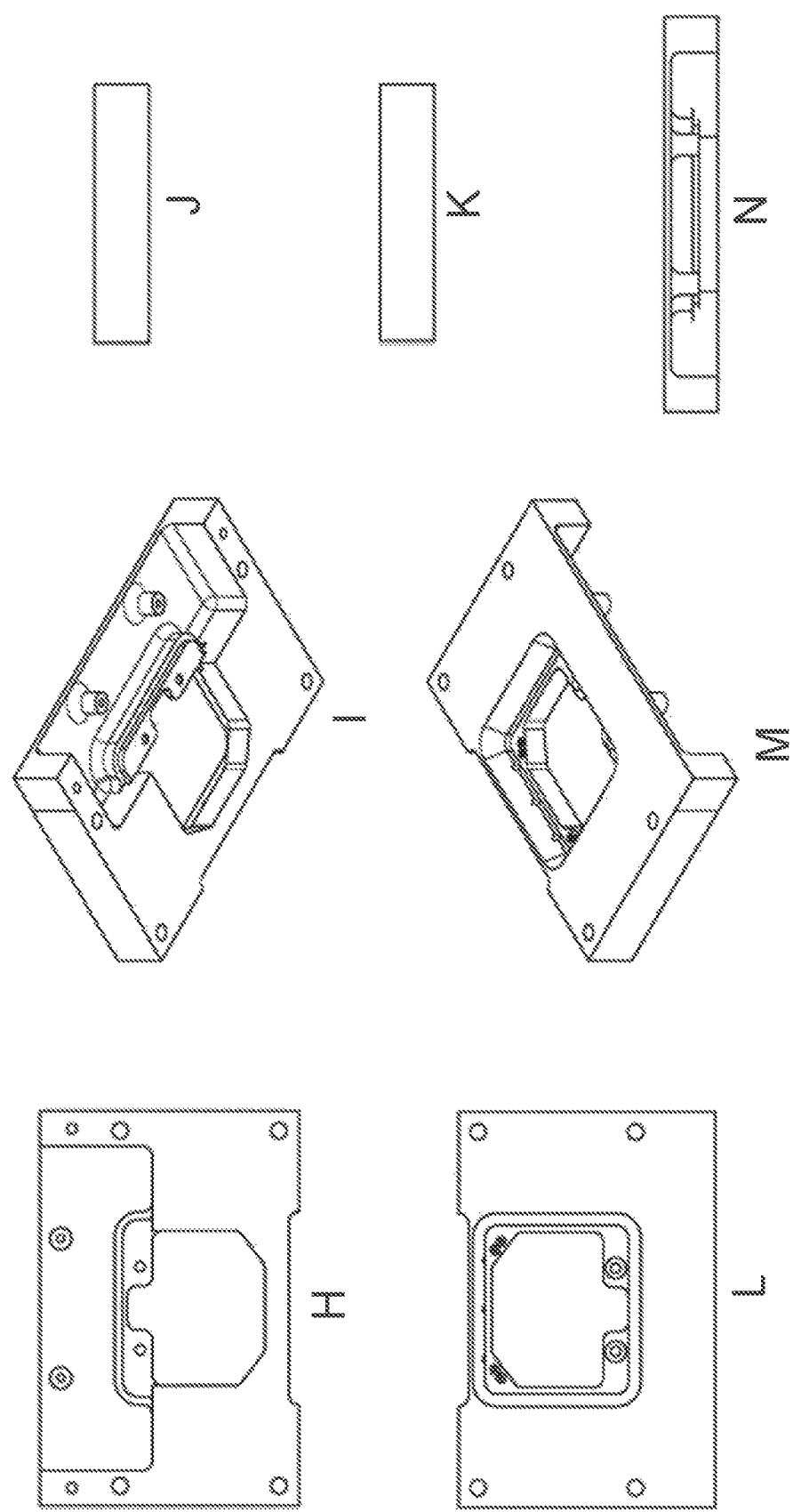

Detected MCF7 Cells

A

B

C

A

B

C

MICROFLUIDIC SYSTEM WITH COMBINED ELECTRICAL AND OPTICAL DETECTION FOR HIGH ACCURACY PARTICLE SORTING AND METHODS THEREOF

RELATED APPLICATIONS

This application is a U.S. National Stage application under 35 U.S.C. § 371 of International Patent Application No. PCT/US2018/017036, filed on Feb. 6, 2018, which claims the benefit of and priority to U.S. Provisional Application No. 62/456,069, filed on Feb. 7, 2017. The entire contents of these applications are incorporated herein by reference in their entirety.

The present patent application incorporates by reference U.S. Pat. No. 9,201,043, titled "Devices for Sorting a Particle in a Sample and Methods for Use Thereof," International Patent Application Publication No. WO 2014/150928, titled "Devices for Sorting Cells in a Sample and Methods for Use Thereof," International Patent Application Publication No. WO2013/052890, titled "Devices for Detecting a Particle in a Sample and Methods for Use Thereof," U.S. Provisional Application No. 62/020,279, titled "Devices for Separating Analytes in a Sample," U.S. Provisional Application No. 62/155,363 "Devices for Separating Analytes in a Sample and Methods for Use Thereof," and U.S. Provisional Application No. 62/346,934 "Metal Node-Pore Sensing," in their entireties.

TECHNICAL FIELD

The subject technology generally relates to detecting, characterizing, sorting, and/or isolating particles.

BACKGROUND

Existing live, single-cell isolation methods include fluorescence-activated cell sorting (FACS), magnetic-activated cell sorting (MACS), serial dilution, micromanipulation, and manual-picking.

FACS and MACS isolation techniques typically lead to the segregation of multiple cell groupings, rather than the isolation of a single cell. FACS and MACS are also ineffective at sorting and isolating single cells from mixed or heterogeneous cell sample inputs. Such techniques are difficult to optimize and are often restricted to core facilities, and consecutive samples analyzed by the same fixed system pass through the same valving, potentially leading to sample contamination.

Serial dilution involves diluting a sample containing cells of interest until there is a statistical likelihood that each aliquot of the diluted sample contains exactly one cell. This technique is labor intensive and results in a low isolation frequency. A high percentage of the target cells of interest may not be present in the input sample, and serial dilution does not provide initial phenotypic information concerning the cells that are present in the input sample. Additionally, serial dilution results in a high variability and lack of reproducibility from isolation to isolation.

Micromanipulation and manual-picking involve the physical selection and isolation of individual cells, but these methods are labor intensive and low throughput.

SUMMARY

Disclosed herein are systems and methods for detecting, characterizing, sorting, and/or isolating particles of interest based on electrical and/or optical detection, and microfluidic flow.

Accordingly, in one aspect described herein is a particle sorter cartridge that comprises a microfluidic chip including a sensing or detector region and may further, optionally comprise a body defining a plurality of reservoirs and/or an interface plate configured to connect to the body and the microfluidic chip, where, upon detection of a particle in the particle flow within the sensing or detector region, a flow of solution within the microfluidic chip is diverted by the application of a trigger flow to sort and/or isolate the detected particle from the particle flow.

In some embodiments, the microfluidic chip, the body, the optional interface plate, or a combination of these elements is disposable.

In some embodiments, the reservoirs defined by the cartridge body include a sample reservoir, a control fluid reservoir, and a trigger reservoir. In some embodiments, the trigger flow comprises a fluid flow from the trigger reservoir.

In some embodiments, the particle sorter cartridge further comprises an optical detector, an electrical detector, or an optical detector and an electrical detector, and the detector or detectors are operably coupled to the detector region of the microfluidic chip. In some embodiments, the detection of a particle in the detector region is based upon a signal generated by the electrical detector. In some embodiments, the detection of a particle in the detector region is based upon a signal generated by the optical detector. In some embodiments comprising both an electrical detector and an optical detector, the detection of a particle in the detector region is based upon a signal generated by the electrical detector, a signal generated by the optical detector, or a signal generated by the electrical detector and a signal generated by the optical detector.

In some embodiments, the cartridge is the cartridge depicted in FIG. 2.

In another aspect provided herein a particle sorting system comprising a base plate and a cartridge assembly, where the base plate is configured to receive and connect to the cartridge assembly, and the cartridge assembly includes a microfluidic chip (including a sensing or detector region), and a body defining a plurality of reservoirs. The cartridge assembly is configured such that, upon detection of a particle in a particle flow within the detector region, a solution flow within the microfluidic chip is diverted by application of a trigger flow to sort and/or isolate the detected particle from the particle flow.

In some embodiments, the microfluidic chip, the cartridge body, or both the microfluidic chip and the cartridge body are disposable.

In some embodiments, the reservoirs defined by the cartridge body include a sample reservoir, a control fluid reservoir, and a trigger reservoir.

In some embodiments, the trigger flow comprises a fluid flow from the trigger reservoir. In some embodiments, the trigger flow from the trigger reservoir is gated by valving. In some embodiments, the trigger flow valving is external to the cartridge assembly.

In some embodiments, the cartridge assembly is further configured so that, upon application of a trigger flow, a solution flow within the microfluidic chip is diverted by valving of one or more carrier flow outlets to sort and/or isolate the detected particle from the particle flow. In some embodiments, the carrier flow comprises fluid from the control fluid reservoir. In some embodiments, the flow from the control fluid reservoir is gated by valving. In some embodiments, the valving is external to the cartridge assembly.

In another aspect provided herein a particle sorting system is the particle sorting system described in Example 8.

In some embodiments, a method for the active isolation of a particle is provided, the method comprising loading a homogeneous or heterogeneous sample mixture or suspension of particles into the cartridge assembly, detecting a particle of interest by optical, electrical, or optical and electrical signals generated by the particle of interest as it passes through the sensing or detector region of the microfluidic chip, actively sorting the particle of interest based upon the optical and/or electrical signal or signals through software means that causes the solution flow within the microfluidic chip to divert by the application of a trigger flow, and depositing a droplet comprising the particle-of-interest into a collection receptacle. In some embodiments, the method for the active isolation of a particle comprises the particle sorting system described in Example 8.

In some embodiments, the detecting step provides a method to measure the velocity of the particle traversing the sensing or detector region. In some embodiments, the method allows for precise triggering of optical detection for quantitative and reproducible measurements for particle characterization as well as minimizing the time the particle is exposed to an optical signal. This method can further comprise a step of increasing the velocity of the particle of interest as it passes through the sensing or detecting region such that the total time the particle is exposed to an optical signal is less than 50, 60, 70, 80, 90, 100, 110, 120, 130, 140, or 150 milliseconds. In some embodiments, the method further comprises a step of increasing the velocity of the particle of interest as it passes through the sensing or detecting region such that the total time the particle is exposed to an optical signal is less than 100 milliseconds.

In one aspect provided herein is a method for the active isolation of a particle of interest comprising flowing a mixture of particles through a microchannel comprising a detector or sensing region, detecting a particle of interest by optical and/or electrical signals generated by the particle of interest as it passes through the sensing or detector region of the microchannel, upon the detection of a particle of interest in the detector or sensing region, diverting the flow of the particle solution by the application of another flow, thereby actively sorting the particle, and depositing a droplet comprising the particle of interest into a collection receptacle.

BRIEF DESCRIPTION OF THE DRAWINGS

A more complete appreciation of the subject technology and many of its advantages will be understood by reference to the following detailed description when considered in connection with the following drawings, which are presented for the purpose of illustration only and are not intended to be limiting.

FIGS. 2A-2I illustrate a body of the cartridge, according to some embodiments.

FIGS. 5A-5C depict the assembly of an exemplary microfluidic chip with a microfluidic chip mold, according to some embodiments.

FIGS. 7A-7I and 8A-8I illustrate a cartridge assembly, including a combination of the components of FIGS. 2A-6G FIGS. 9A-9N illustrate an exemplary base plate of an associated hardware platform, according to some embodiments.

DETAILED DESCRIPTION

Figures 14A, 14B, 14C:
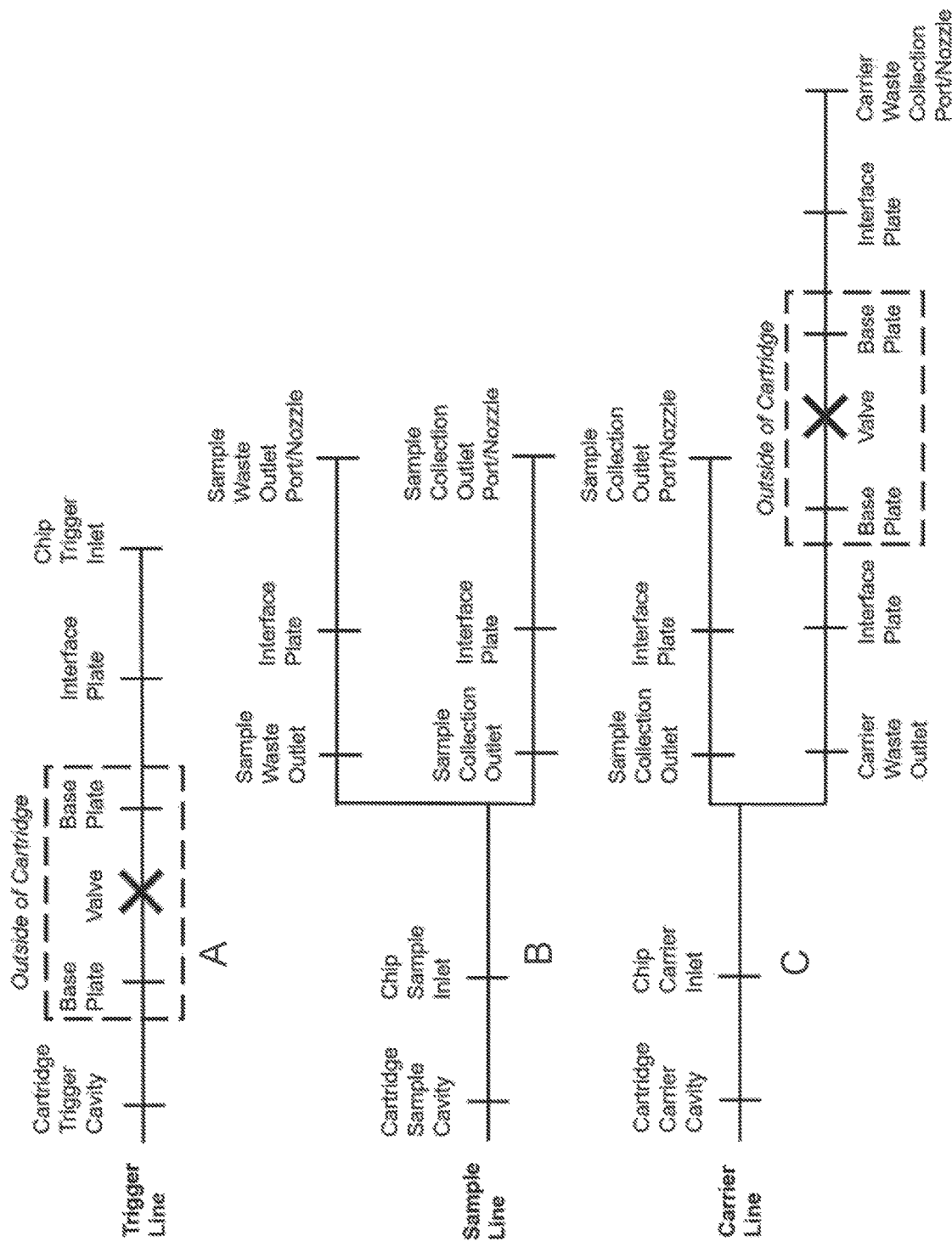
FIGS. 14A-14C are a schematic representation of the fluid paths in the exemplary subsystem depicted in FIG. 13.

Systems and cartridges described herein advantageously provide functionality for simultaneously performing two or more of the functions below:

Detect, sort, and isolate with sheathless operation;

Accelerate drop creation and dispensing with the carrier line (not needing to use the sample line) to improve functional sorting frequency. To reach a minimum volume needed for dispensing/dropping, sufficient fluid must exit the collection outlet, and designs described herein make this possible without flowing more sample into the collection outlet than minimally desired. Drop creation and dispensation timings can also be tuned without needing to change the sample flow rate;

Minimize fluid into the collection outlet leading to drop creation when no particle is detected. Because of the carrier waste pathway and external valving, carrier flow can flow primarily through the carrier waste outlet when no particle of interest is detected, drastically reducing the collection of droplets that do not contain particles of interest;

Selectively diverting particles from the collection outlet, even downstream of detection, such that drops exiting the collection outlet can be ensured to only contain the desired number of particles (e.g., one particle, when implemented for single particle dispensing); and Control particle direction without valving the sample (i.e., particles from one test never contact surfaces that particles from a previous test contacted). By virtue of how the fluid is routed according to designs described herein, only the carrier and trigger fluid paths ever leave the cartridge and are valved externally (for example as shown in FIGS. 14A-14C, illustrating fluid paths).

System Overview

Figure 1:
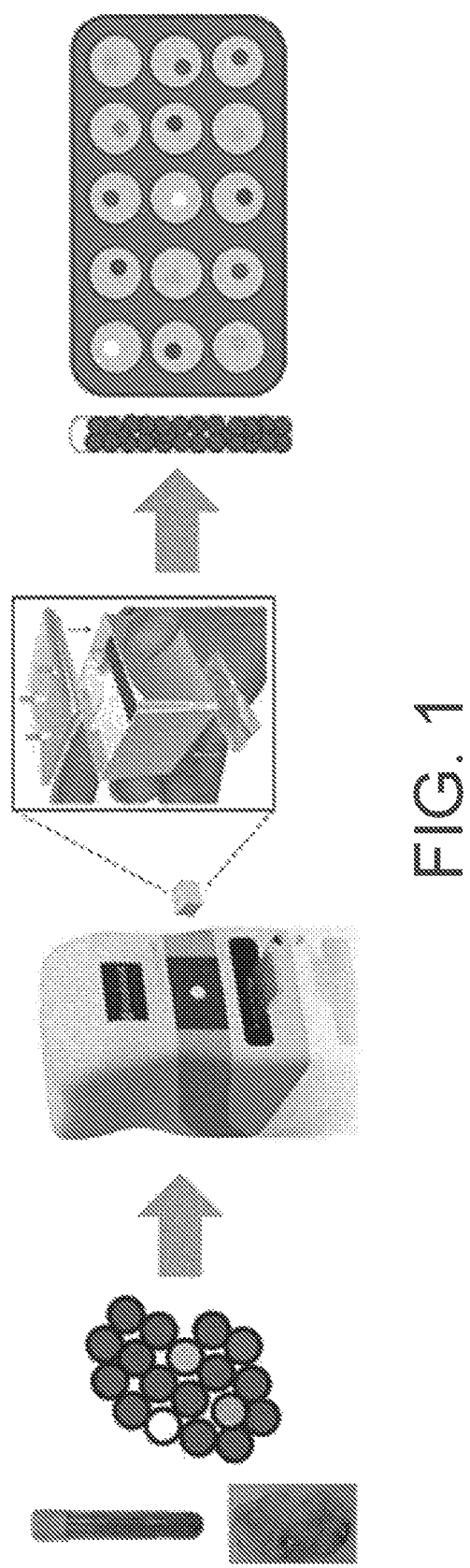
FIG. 1 is a diagram showing a broadly applicable system platform and basic workflow, according to some embodiments.

FIG. 1 shows the broadly applicable system platform and basic workflow. An input sample can be essentially any sample, including pre-enriched cell samples, whole blood, plasma, dissociated tissue, cultured cell lines, transfected cells, urine, or agricultural, forensic, or general biological samples, as well as non-biological samples such as colloidal solutions. The sample is loaded into a cartridge, which is then inserted into a hardware platform containing a detection module and a microfluidic module for the collection of desired particles of interest from the sample. For purposes of the present disclosure, "particles" can refer to cells, cellular vehicles, virus, DNA, RNA, polymers, such as polystyrene beads, latex beads, colloids (e.g., metal colloids), magnetic particles, dielectric particles, crystals (e.g., micro-crystals or nano-crystals), bioparticles such as pores, pollen, cellular occlusions, precipitates, intracellular crystals, biological molecules, including viruses, peptides, antibodies, diabodies, etc., fragment antigen-binding (Fab) fragments, binding proteins, phosphorylated proteins, aptamers, epitopes, polysaccharides, polypeptides, proteins, lipids, peptidoglycans, phospholipids, sugars, glycoproteins, sugar chains, nucleic acids, ribosomes, and any other cellular components, particulates, fibers, impurities, contaminants, and synthetic particles having a size range of 0.01 nm to 100 mm. For example, single (individual) particles can be collected and each deposited into corresponding separate wells of a microtiter plate through the integration of the microfluidic module and robotic control of the microtiter plate.

In some embodiments, the workflow for the instant technology can comprise loading a fluid sample and buffers into the cartridge, placing the cartridge into the base plate of the hardware platform, providing air pressure to the loaded fluids to produce a flow, sensing and detecting particles as they pass through the sensing region or regions of the microfluidic chip, and sorting and isolating the detected particles of interest.

Terms used in the claims and specification are defined as set forth below unless otherwise specified.

"Particle," as used herein, refers to any object that can be characterized, detected, sorted, and/or isolated. Particles include but are not limited to DNA, RNA, polymers, such as polystyrene beads, latex beads, colloids (e.g., metal colloids), magnetic particles, dielectric particles, crystals (e.g., micro-crystals or nano-crystals), bioparticles such as pores, pollen, cellular occlusions, precipitates, intracellular crystals, biological molecules, including viruses, peptides, antibodies, diabodies, etc., Fab fragments, binding proteins, phosphorylated proteins, aptamers, epitopes, polysaccharides, polypeptides, proteins, lipids, peptidoglycans, phospholipids, sugars, glycoproteins, sugar chains, nucleic acids, ribosomes, and any other cellular components, particulates, fibers, impurities, contaminants and synthetic particles having a size range of 0.01 nm to 100 mm.

"Cell of interest" or "target cell," as used herein, refers to a biological particle that it is desirable to detect, characterize, sort, or isolate. In some embodiments, the cell of interest or target cell will be a functional unit of an organism, tissue, or a single-cell organism. In some embodiments, a cell of interest or target cell is part of a class or category of functional units of an organism, tissue, or single-cell organisms. Cells of interest or target cells may be cancerous or precancerous cells or they may be normal or not diseased cells.

"Cartridge," as used herein, refers to a container that comprises at least a cartridge body, a chip substrate, and a chip mold. In some embodiments, the cartridge also comprises an interface plate. In some embodiments, the cartridge is a "disposable cartridge," wherein the cartridge body, chip substrate, chip mold, another cartridge body component, or any combination of cartridge components is disposable.

The cartridge body of a cartridge comprises at least one sample reservoir and at least one control fluid reservoir. The chip mold comprises microchannels that can carry a fluid or fluids from the cartridge body of a cartridge. The chip substrate and chip mold also comprises detection and sorting regions. In some embodiments, the cartridge body is connected to the chip substrate and mold through an interface plate.

The term "sample reservoir" (or "sample cavity") as used herein refers to a reservoir of the cartridge body that can contain a fluid, solution, or mixture. In preferred embodiments, these fluids, solutions, or mixtures comprising cells or particles of interest including heterogeneous mixtures of cells or particles. The volume of fluid that can be contained in a sample reservoir can be as little as 1 microliter.

"Control fluid reservoir" (or "control reservoir" or "control cavity") as used herein refers to a reservoir of the cartridge body that can contain a fluid, solution, or mixture. This fluid, solution, or mixture may be a buffer or buffer mixture, a cellular medium or cellular media mixture, or any reagent or reagents. In some embodiments, the control fluid reservoir is a "carrier" reservoir that provides a flow stream to advance particles from the sample fluid towards the collection outlet. In some embodiments, the control fluid reservoir is a "trigger" reservoir that selectively directs detected and/or characterized particles from the sample fluid. As described herein, in some embodiments, a plurality of control fluid reservoirs (e.g., including a trigger reservoir and a carrier reservoir) are used in a single implementation.

The term "light pipe," as used herein, refers to a hole, aperture, bore, void, or other passageway for light. In some embodiments, the light pipe is an open cylinder made of a material that prevents the passage of light except for light from the light source (positioned at the top of the pipe) and light that is emitted back from particles, including labeled particles, in the sensing or detector region of the microfluidic chip (positioned beneath the bottom of the pipe). In some embodiments, the light pipe can be made of open space and/or transparent material not limited to glass, PMMA, cyclic-olefin-copolymer, or any similar materials known to practitioners of the art. In preferred embodiments, the light pipe allows passage through the cartridge body and interface plate to the microchip substrate and mold. The light may be any wavelength or mixture of wavelengths. In some embodiments, the light source can provide specific excitation wavelengths or mixture of wavelengths using light filters as is known in the art. The light that travels through the light pipe may be excitation light, emission light, or both.

"Interface plate," as used herein, refers to an object that connects the cartridge body to the microfluidic chip. The interface plate provides passage for fluids in the reservoirs of the cartridge body to the microchannels of the microfluidic chip. In some embodiments, the interface plate is the location of the microphase-macrophase transition or transitions, or interface or interfaces. The interface plate may provide the connection between the cartridge body and the microfluidic chip in any manner, including fluid passages, valving, or other means.

The term "microfluidic chip," as used herein, refers to an object comprising a microfluidic substrate and a microfluidic mold. The microfluidic chip comprises passages or microchannels for the fluids loaded into the reservoir or reservoirs of the cartridge body. One or more of these microchannels can comprise one or more sensing regions. One or more of these microchannels can comprise one or more sorting regions.

The term "sensing region," as used herein, refers to a portion of a microfluidic chip that comprises a portion of a microchannel that produces a detectable signal or signal change as a particle of interest travels through it. In preferred embodiments, the detectable signal or signal change occurs with respect to individual particles as they pass serially, one-by-one, through the sensing region. The detectable signal or signal change can be of any type or combination of types. Particular types of signal or signal change, dependent upon the embodiment, can include optic or fluorescent and electrical signals.

The term "fluorescent detection," as used herein, refers to sensing a signal or change in signal, the signal being a light wavelength or wavelengths, such as ultraviolet light or visible light. The signal being sensed can be produced or altered by a particle emitting a light wavelength (e.g., an emission signal) in response to exposure to an excitation light.

The term "electrical detection," as used herein, refers to sensing a signal or change in signal, the signal being impedance, resistance, or another characteristic of current. The signal being sensed can be produced or altered by a particle crossing the path of an electrical current. In some embodiments, electrical detection includes use of the Coulter Principle.

"Node pore sensing" (NPS), as used herein, refers to screening single particles, such as cells, by electrical detection as they pass through one or more nodes. In some embodiments, NPS comprises one or more surface functionalized regions with a retarding agent. Determining the time a single particle is retarded provides characteristic information concerning that particle. References relating to NPS, which are hereby specifically incorporated by reference, are U.S. Pat. No. 9,201,043 and Balakrishnan et al., (2015), Anal. Chem. 87 (5), 2988-2995.

"Sensitivity of detection," as used herein, refers to the ability to detect and/or characterize a particle in the sensing region of the instant technology. Sensitivity of detection can include, but is not limited to, sensing electric and/or optic signals, or changes in such signals.

"Dynamic range," as used herein, refers to the ability to detect signals and changes in signals resulting from a particle in the sensing region of the instant technology. The dynamic range includes both large-scale signal detection (e.g., a binary no signal/signal system) and small-scale signal detection (e.g., differentiating between two similar but distinct signals).

It must be noted that, as used in the specification and the appended claims, the singular forms "a," "an," and "the" include plural referents unless the context clearly dictates otherwise.

System Elements

Figure 13:
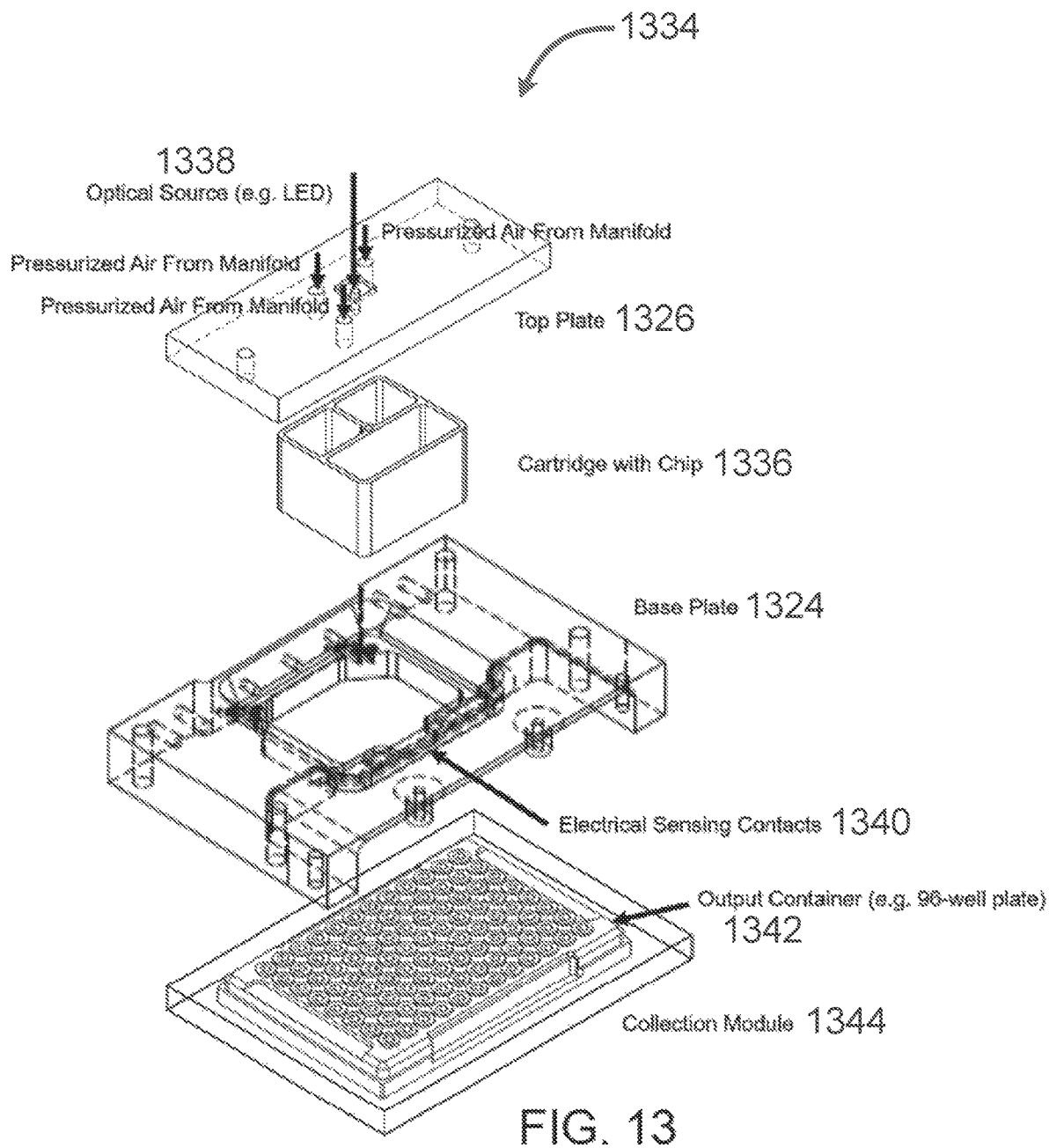
FIG. 13 depicts an exemplary subsystem layout, according to some embodiments.

In some embodiments, a system comprises a hardware platform, a microfluidic cartridge, and one or more collection devices. The hardware platform provides the pneumatics, electronics, detection equipment (e.g., a photodiode light source or an LED light source and optic detector, and/or a detector for electrical signals caused by passage of a particle through the sensing region), and other elements of the system. For example, the hardware platform can include a housing, pneumatics module, collection module, electronics module, and a detection and sorting module. The housing can be used to support and align each of the components of the instrument including the pneumatics, detection, sorting, and collection modules (FIGS. 9A-9N, FIGS. 10A-B, and FIGS. 16A-D). The design of the embodiment shown in FIG. 13 enables single-axis alignment as all contacts and/or interfaces occur in the same axis. The pneumatics module can comprise three pressure sources—a sample, a trigger, and a carrier, which feed into the different cavities of the microfluidic cartridge. The collection module houses the output container, which can include a plurality of collection chambers (e.g., 1 for a single collection tube, 96 for a 96-well microtiter plate, 384 for a 384-well microtiter plate, etc.) depending on the desired application. FIG. 13 depicts an embodiment where the collection module comprises a 96-well microtiter plate. The collection module can be moved (i.e., actuated or "translated") to collect drops into collection chambers from the cartridge as desirable.

The electronics module can include the electric subsystem of the hardware platform and the stage subsystem (e.g., well plate driver) of the hardware platform.

Figure 17:
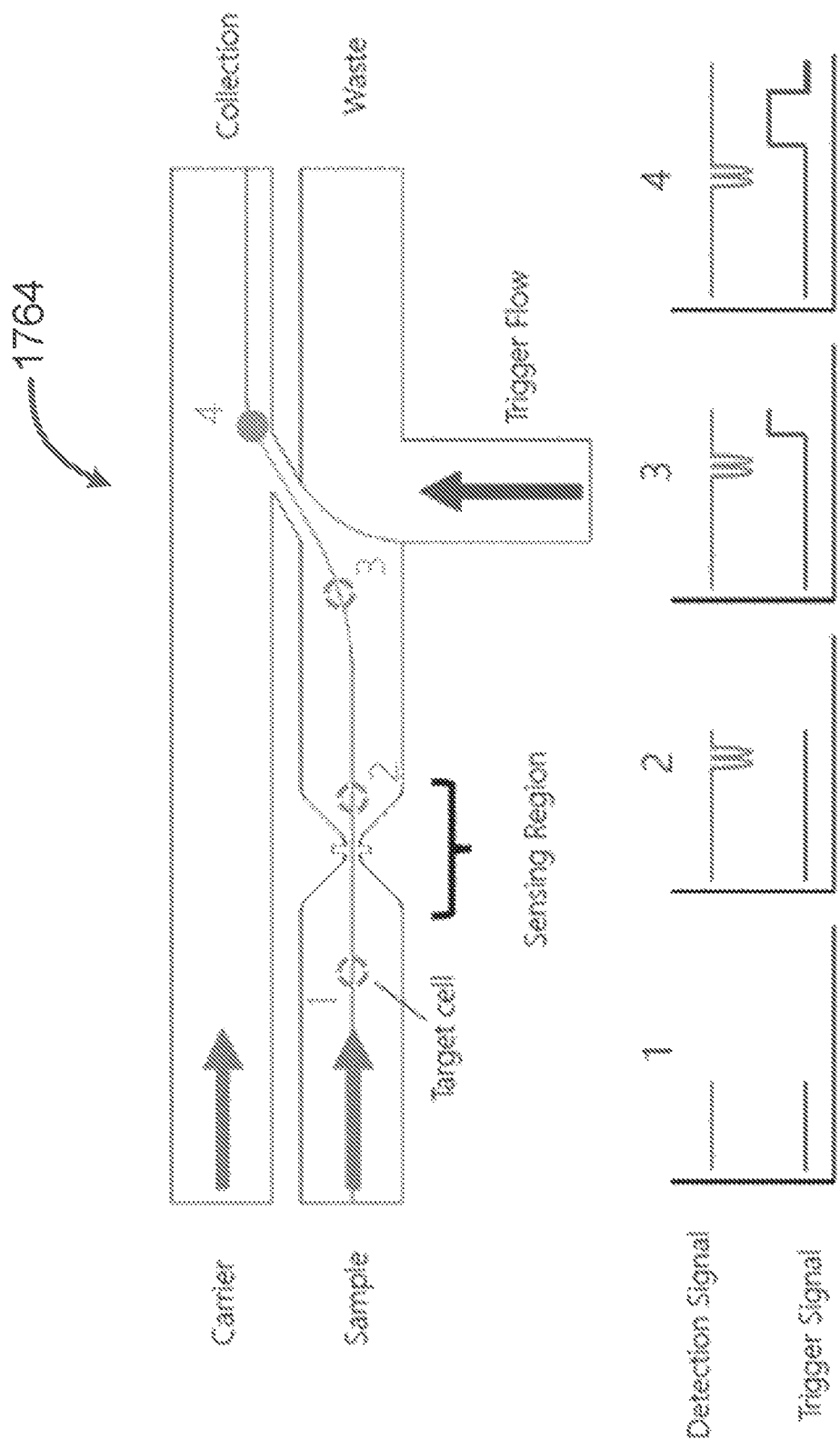
FIG. 17 illustrates an exemplary scheme for particle detection and/or sensing and isolation, according to some embodiments.

The detection and sorting module can comprise a detection region which either detects or determines a characteristic of a particle in the sample fluid and a sorting region which switches the particle into a collection flow stream. An exemplary implementation of the detection and sorting module is depicted in FIG. 17.

The preferred microfluidic cartridge is disposable. A disposable cartridge ensures that an individual sample does not come into contact with a previous sample or interface with any surfaces on the cartridge or instrument that a previous sample came into contact with. The microfluidic disposable cartridge comprises at least three stages of architecture: (1) the body, (2) the microfluidic substrate, (3) and the microfluidic chip mold. In some embodiments, a fourth stage, the interface plate, is also included.

The body of the disposable cartridge can include a sample reservoir and a control fluid reservoir or a plurality of control fluid reservoirs.

The hardware platform enables the various modules of the system to act in concert.

The microfluidic cartridge comprises a cartridge body, a microfluidic chip substrate, and a microfluidic chip mold. The cartridge body comprises at least a sample reservoir and a control reservoir. These reservoirs are connected through fluid passages to the microfluidic chip substrate and the microfluidic chip mold. The microfluidic chip substrate and the microfluidic chip mold are bonded to form a microfluidic chip. In some embodiments, the, microfluidic chip substrate and the microfluidic chip mold are bonded through one of, or a combination of, heat, lamination, and solvent, though the substrate and the mold can be bonded by any appropriate method. The chip comprises at least a microfluidic channel that enters a sensing region, a sensing region, and a microfluidic channel that exits the sensing region that has at least one sorting region to direct the flow of sample solution for single particle collection or isolation. In some embodiments, the connection between the cartridge body and the microfluidic chip substrate and mold is provided by an interface plate comprising fluid passages or "channels." During use, fluid is routed through the interface plate channels, enters the base plate (which houses valves), and then returns to the interface plate. The collection device provides a receptacle that can receive sample output in the form of sorted or isolated droplets from the microfluidic cartridge.

FIGS. 2A-6G show an embodiment of a cartridge assembly architecture. The cartridge assembly can be described to have four components: a cartridge body, an interface plate, a chip substrate, and a chip mold. One or more of these components can be disposable.

FIGS. 2A-2I show a body of the cartridge. The cartridge body 200 has at least a sample reservoir and a control fluid reservoir (each of which may also be referred to as a "cavity"). In the embodiment shown in the FIGS. 2A-2I, there are two control fluid reservoirs 202A, 202B, or "buffer reservoirs," and one sample reservoir 204. One of the depicted control fluid reservoirs 202 acts as a "carrier" reservoir that provides a flow stream to advance the particles to the collection outlet. The other depicted control fluid reservoir acts as a "trigger" reservoir to selectively direct detected and/or characterized particles. In some embodiments, flow streams from the carrier and/or trigger reservoirs are determined in response to the flow stream provided by the sample reservoir. Any one or any combination of the reservoirs may comprise a reservoir floor that possesses an incline, slope, or angle such that liquids placed in the reservoir will continuously accumulate proximate to the reservoir's fluid inlet.

In some embodiments, the flow stream provided by the carrier reservoir has a constant rate. In some embodiments, the flow stream provided by the carrier reservoir is uninterrupted. In some embodiments, the flow stream provided by the trigger reservoir is provided as a pulse or transient flow of solution.

In FIGS. 2A-2I, the sample reservoir 204 can function for its intended purpose with as little as 1 microliter of solution up to 10 milliliters of solution. There are no limits to the size of the sample reservoir 204, which may contain any volume of sample solution. In some embodiments, the sample reservoir 204 may contain more than 1 milliliter, 10 milliliters, 15 milliliters, 20 milliliters, 30 milliliters, 50 milliliters, 100 milliliters, or 1 liter. The two control fluid reservoirs 202A, 202B can function with as little as 1 microliter of solution up to 10 or more milliliters of solution. The two control fluid reservoirs can function with as little as 10 microliters or less of solution up to 100 milliliters or more of solution. The two control fluid reservoirs may be loaded with any appropriate solutions. In some embodiments, these solutions comprise a buffer or buffers, a reagent or reagents, a medium or media, or any combination of buffers, reagents, and media.

As depicted in FIGS. 2A-2I (by way of example only), the cartridge body 200 has overall dimensions of 54 mm×46 mm×32.4 mm.

The cartridge body 200 can comprise an inert material, such as acrylic, polycarbonate, cyclic olefin polymer/copolymer (COP, COC), acrylonitrile butadiene styrene (ABS), polystyrene, or other suitable material. In one embodiment, the cartridge body 200 is machined out of acrylic polymer. The cartridge body 200 can be formed via machining or injection molding.

The body stage (i.e., one of the at least three stages of the microfluidic cartridge) may have any overall dimensions appropriate for its use. In some embodiments, appropriate dimensions may be determined in response to the volume or volumes of the liquid or liquids to be loaded into the sample reservoir or the control fluid reservoir or reservoirs of the body stage. In some embodiments, the dimensions of the body stage will be determined in response to the dimensions of other stages of architecture in the microfluidic cartridge. In some embodiments, the dimensions of the body stage may be determined by the hardware platform into which the cartridge is to be loaded.

To the bottom of the cartridge body 200 (an exemplary bottom view is shown in FIGS. 2A-2C), an interface plate can be attached. Fluid inlet passages (see, e.g., aperture 206) connect the sample reservoir and control fluid reservoirs through the interface plate to the microfluidic chip. The diameter of the apertures configured to interface with fluid inlet passages (i.e., the smaller apertures—206) in FIG. 2 are $\frac{1}{32}$ inches, however the diameter of the apertures can be any size that is suitable for a given implementation. In some embodiments, one or more of the reservoirs' apertures have diameters unequal to one or more diameters of the other reservoirs' apertures. The fluid inlet passages may have any appropriate dimension to connect the sample and control fluid reservoirs to the microfluidic chip. For example, the diameter of the fluid inlet entry in the interface plate (connecting to the body stage) may be about 0.1, 0.2, 0.3, 0.4, 0.5, 0.6, 0.7, 0.8, 0.9, 1, or greater than 1 millimeter. One or more of the apertures (e.g., aperture 208) can serve as a light bore for optical detection, rather than for fluid transfer. In some embodiments, there is one aperture at the bottom of each reservoir/cavity of the cartridge body. A cavity of the sample reservoir 204 can be larger than the cavities of the control fluid reservoirs 202A, 202B.

In some embodiments, a light pipe core can be positioned through the center of the cartridge body and the interface plate. In such embodiments, when the cartridge is placed into the base plate of the hardware platform, a fluorescent element (both emission element and detection element) can be positioned above the light pipe core. Emission and detection signals can travel through the light pipe core relative to the sensing region in the microfluidic chip (see FIG. 15). In other embodiments, there is only an electrical detection module and therefore the light pipe core is optional or absent.

FIGS. 3A-3F show an exemplary interface plate. The interface plate 310 contains fluid channels 312 configured to connect the sample and control reservoirs of the cartridge body (e.g., the cartridge body 200 of FIGS. 2A-2I) to the microfluidic chip. In some embodiments, valves and pressure regulators control the flow rate of solution from the sample and control fluid reservoirs through the fluid channels 312 in the interface plate 310 and then to fluid vias that connect the fluid channels in the interface plate 310 to the microfluidic chip. The interface plate may be produced by any appropriate technique and in any appropriate matter. In one embodiment the bodies are machined out of polycarbonate polymers. In another embodiment the body is formed through injection molding.

In some embodiments, the interface plate includes one or more of: fluid channels that are configured to connect the sample and control reservoirs in the body stage to the microfluidic chip, fluid channels connecting the trigger reservoir to the base-plate external valve and connecting the base-plate external valve to the microfluidic chip, fluid channels connecting the carrier waste outlet to an external valve and from the external valve to a waste outlet, and fluid channels connecting the microfluidic chip to dispensing nozzles or outlets exiting the cartridge. In embodiments without an interface plate, these connections are provided directly between the appropriate stages of the microfluidic cartridge.

In some embodiments, the interface plate is adhered to the bottom of the body stage. This is accomplished in certain embodiments by a pressure sensitive adhesive, glue, thermal bonding, ultrasonic welding, or other suitable methods.

In some embodiments, the dispensing nozzles include a nozzle vibration cavity that is controlled by software, where the control of vibration can modulate the flow rate of solution. In some embodiments, the nozzle vibration is provided by a piezoelectric device. In some embodiments, the interface plate has a plurality of nozzles that allow for buffer or sample to exit the cartridge. In some embodiments, the interface plate has one nozzle for collection and/or dispensing liquid. In some embodiments, one or more of the nozzles may be replaced with a hole that feeds into the base plate for routing liquids.

O-ring grooves can be included, to allow for sealed fluidic contact with pneumatic valves, for contact between the cartridge and the lid, or for contact between the base plate and the cartridge.

Figures 3A, 3B, 3C, 3D, 3E:
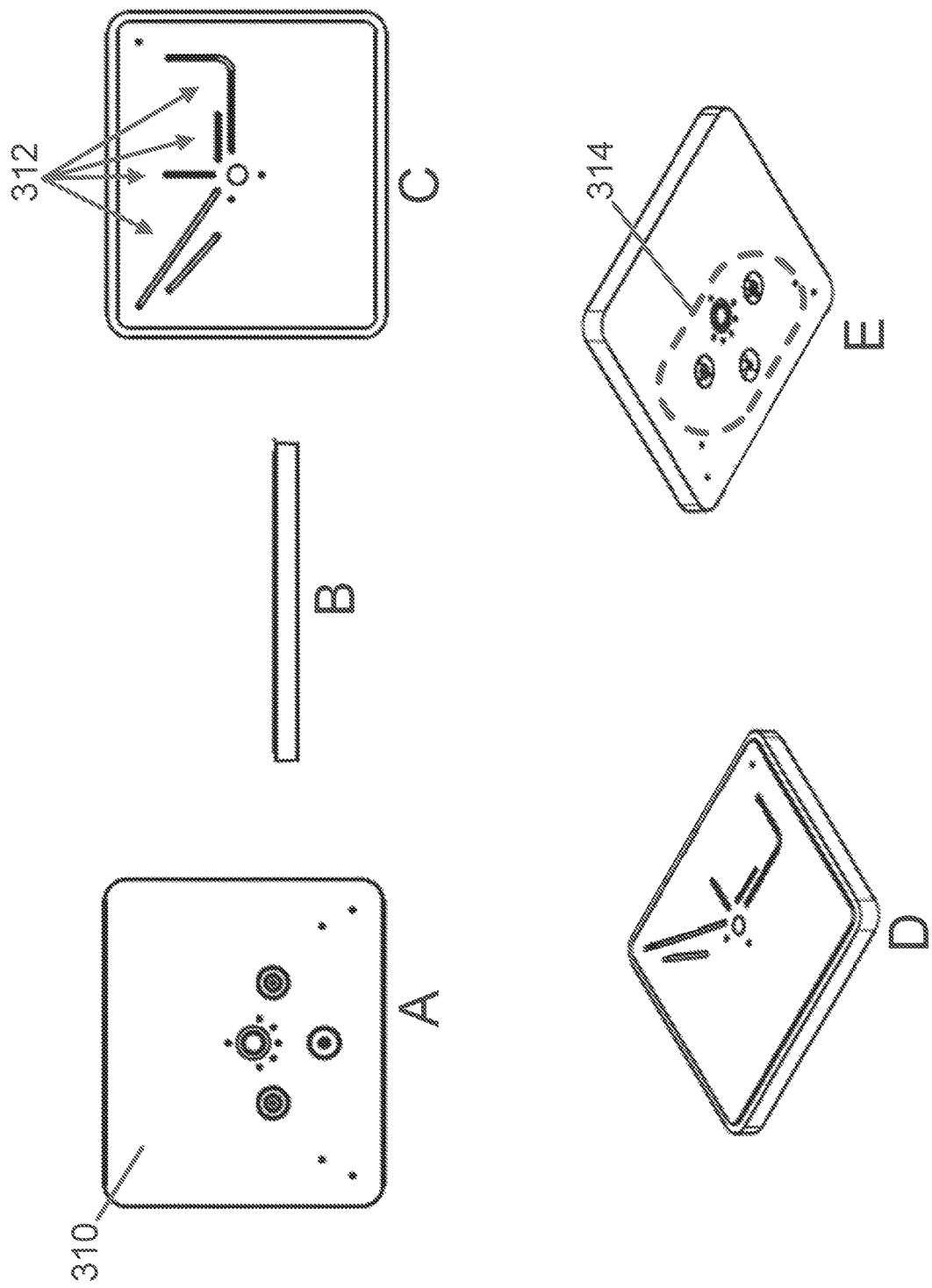
FIGS. 3A-3F illustrate an interface plate, according to some embodiments.
Figure 3F:
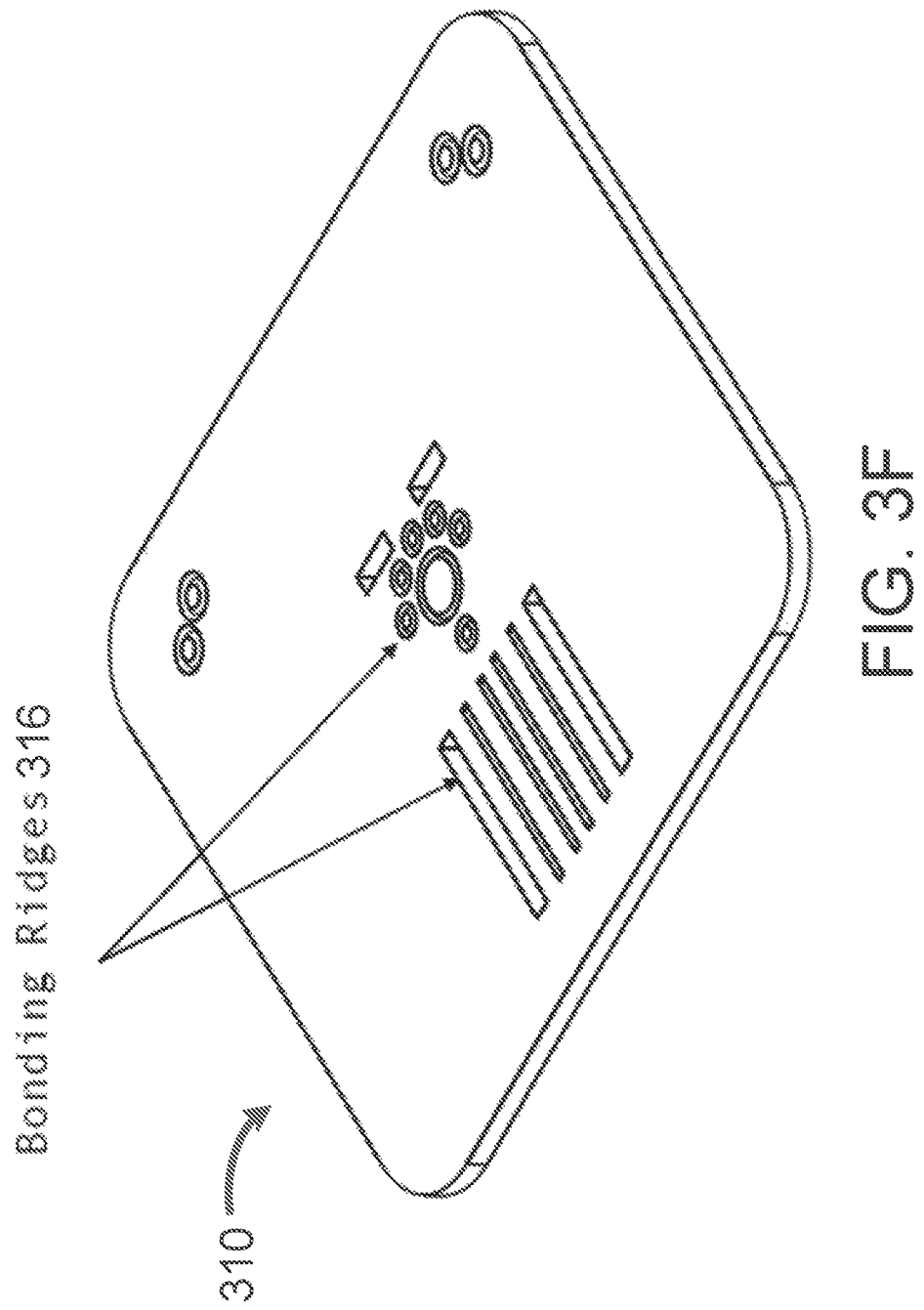

FIG. 3F shows how the architecture of the interface plate 310 is aligned with the architecture of a microfluidic chip. Ridges 316 for alignment and bonding ensure proper attachment of the interface plate 310 with the microfluidic chip.

The overall dimensions of the interface plate 310 as depicted in FIGS. 3A-3F are 54 mm×46 mm×4.3 mm, however the interface plate may have any overall dimensions appropriate for its use. For example, in some embodiments, the dimensions of the interface plate will be determined in response to the dimensions of other stages of architecture in the microfluidic cartridge. In some embodiments, the dimensions of the interface stage may be determined by the hardware platform into which the cartridge is to be loaded.

Figure 4A:
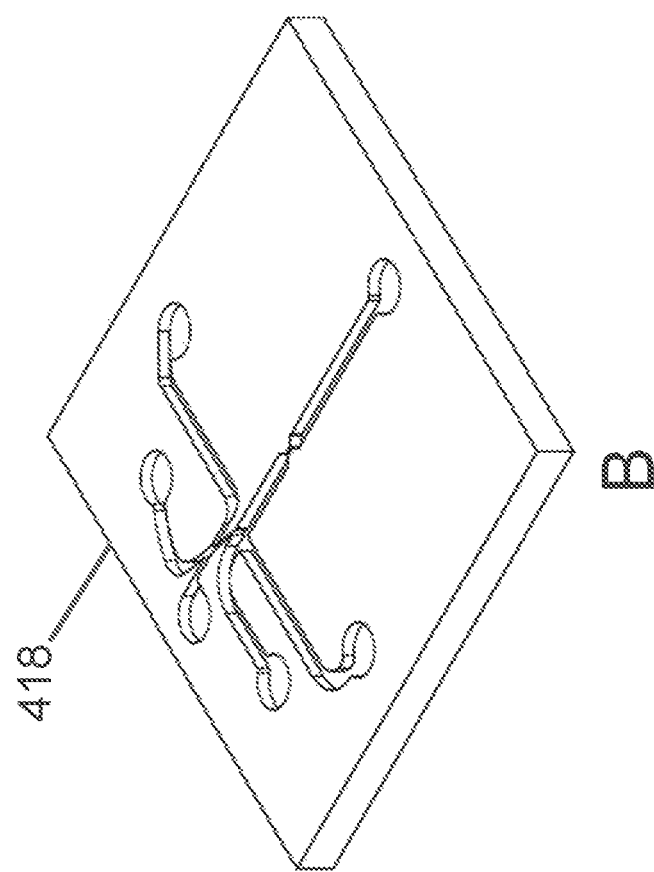
FIGS. 4A-4B illustrate a microfluidic chip mold, according to some embodiments.
Figure 4B:
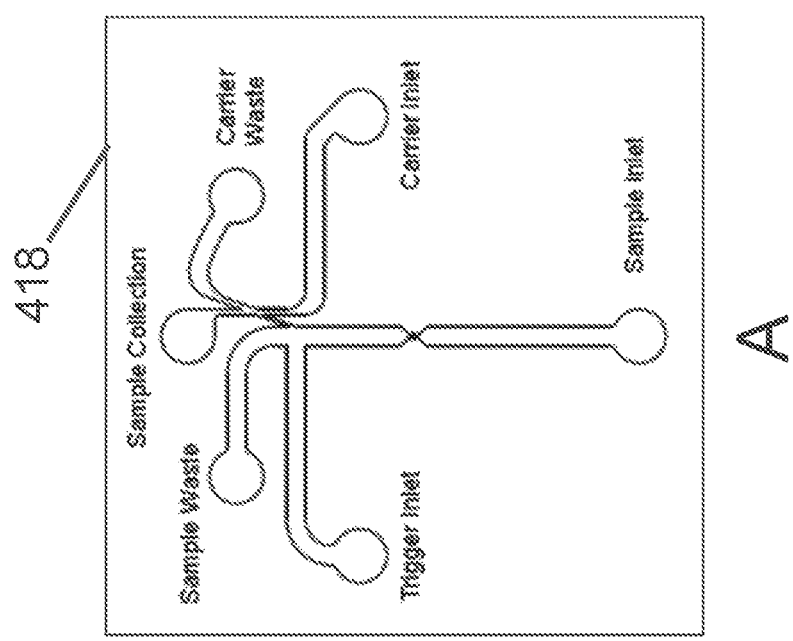
Figure 6A:
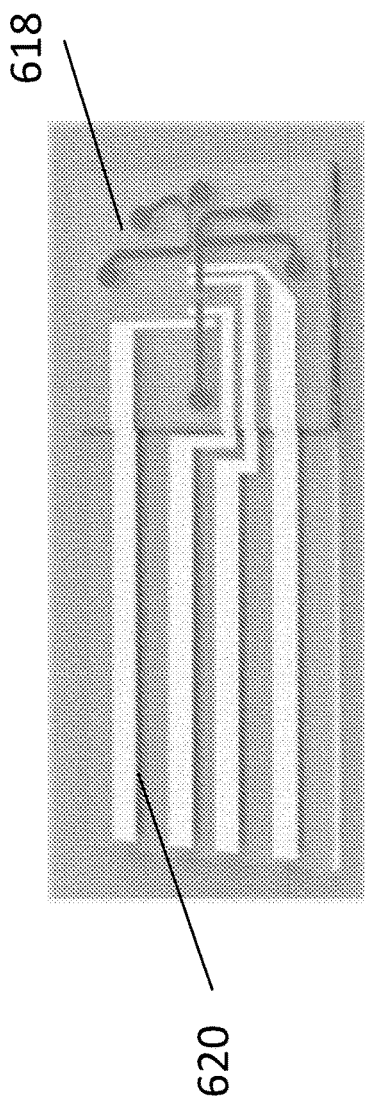
FIGS. 6A-6G illustrate an assembled microfluidic chip and microfluidic chip mold, with detection and sorting regions, according to some embodiments.
Figure 6C:
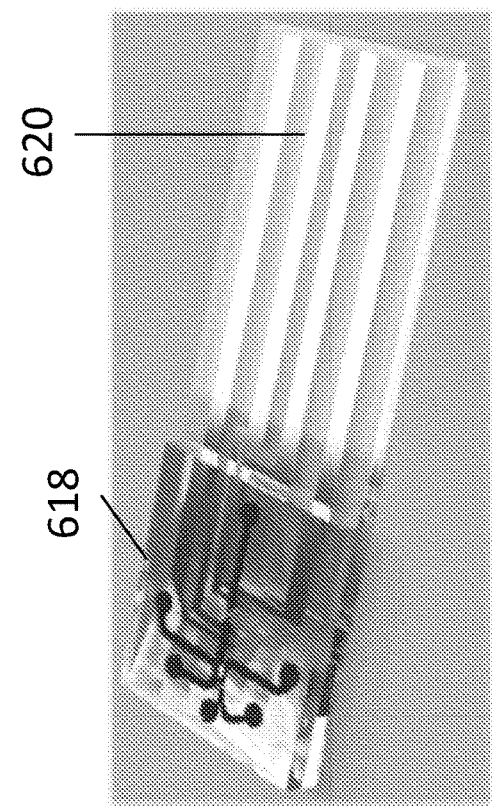
Figure 6B:
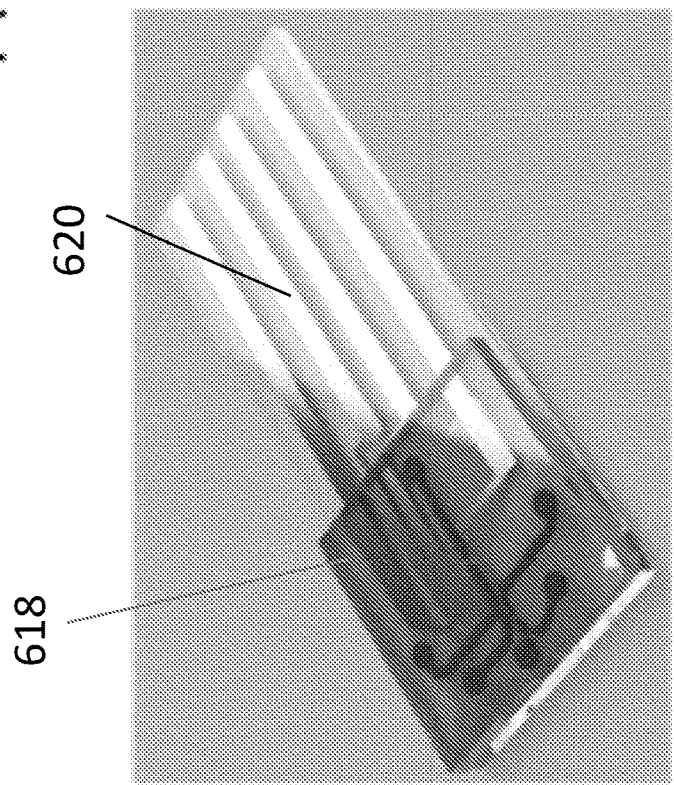
Figure 6E:
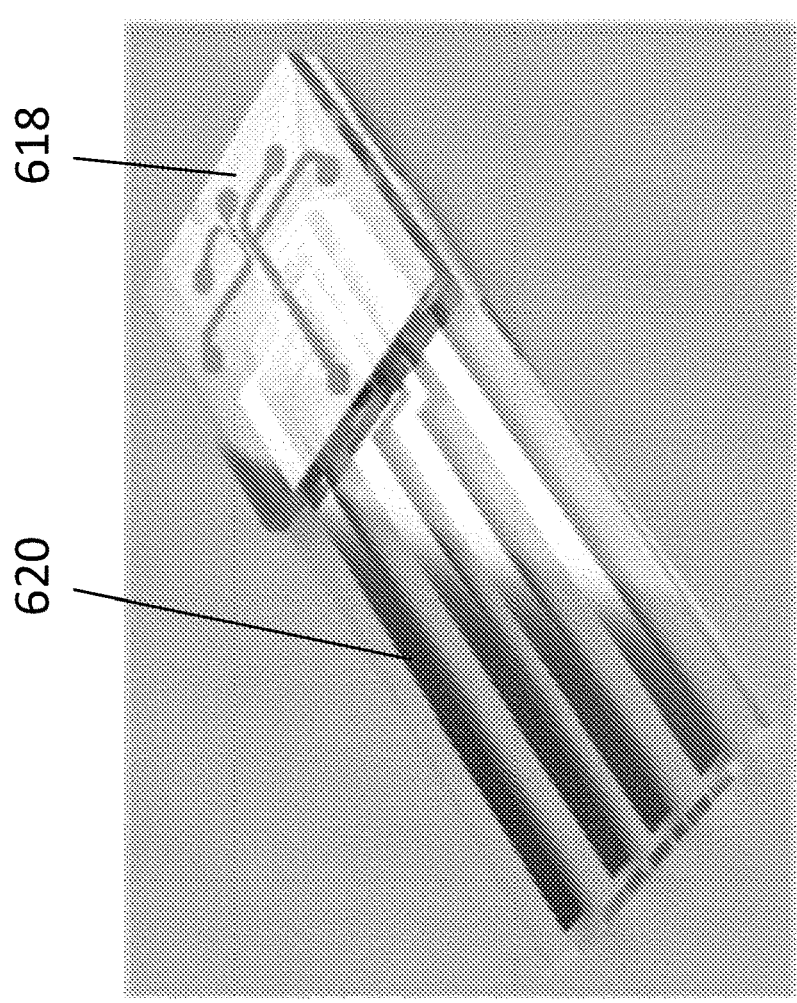
Figure 6D:
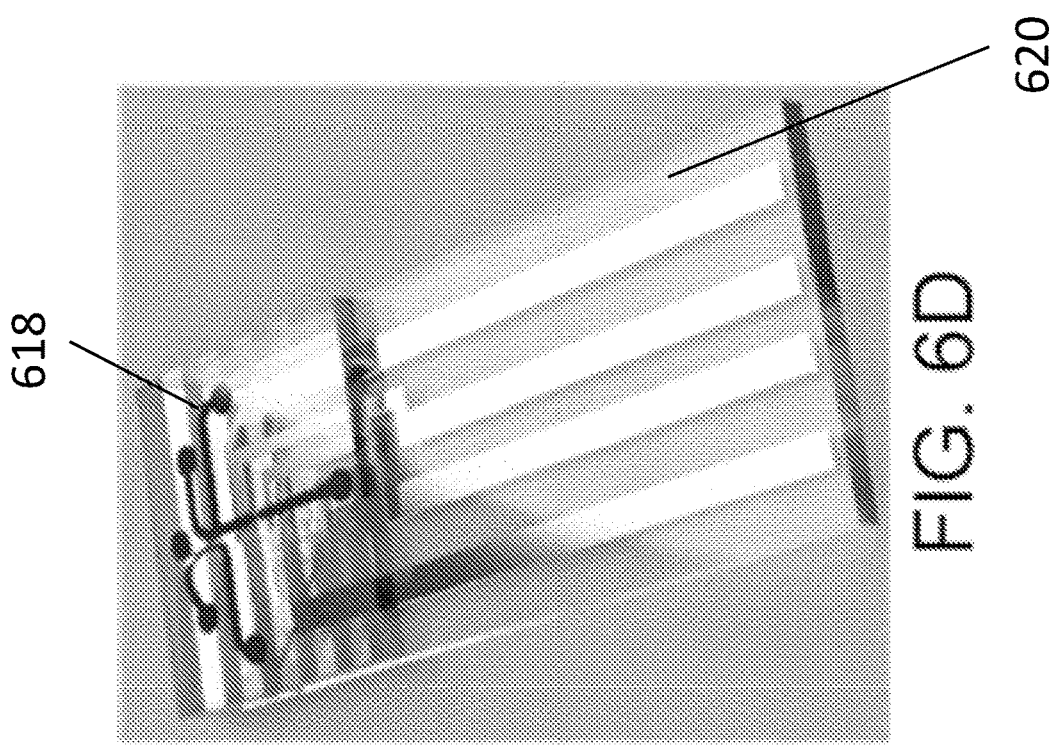
Figure 6G:
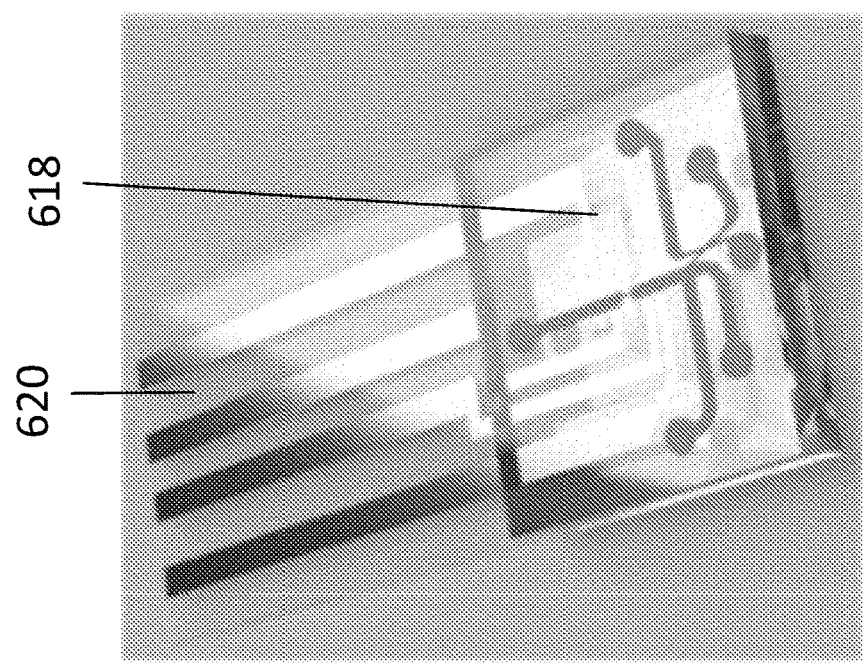
Figure 6F:
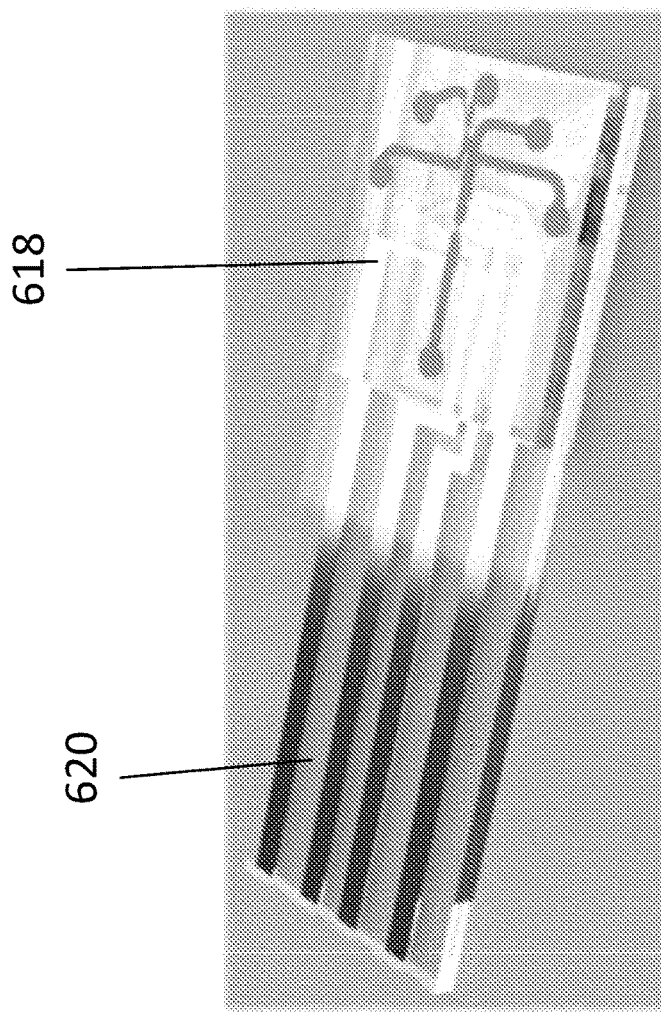
Figure 7A:
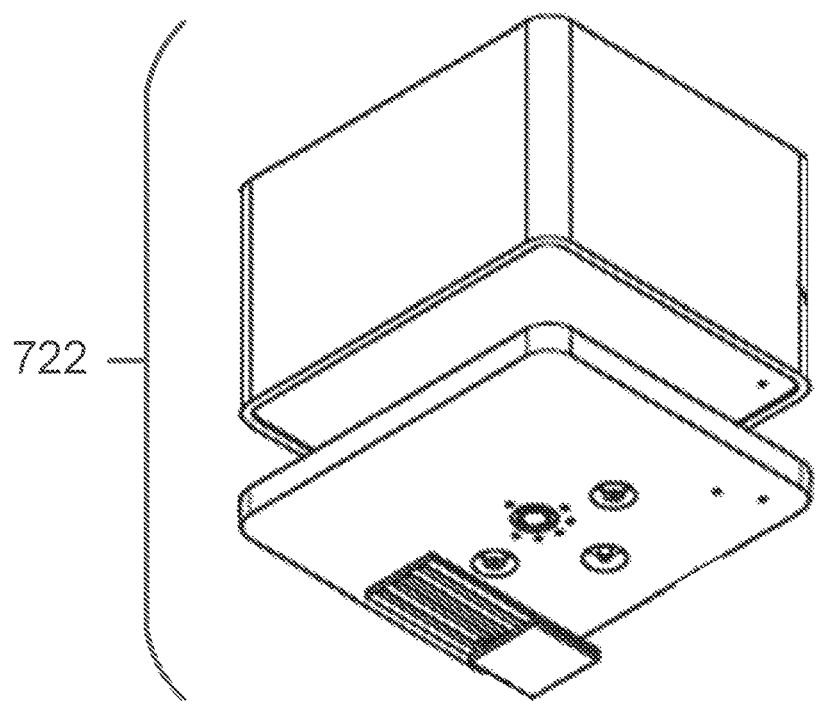
Figure 7B:
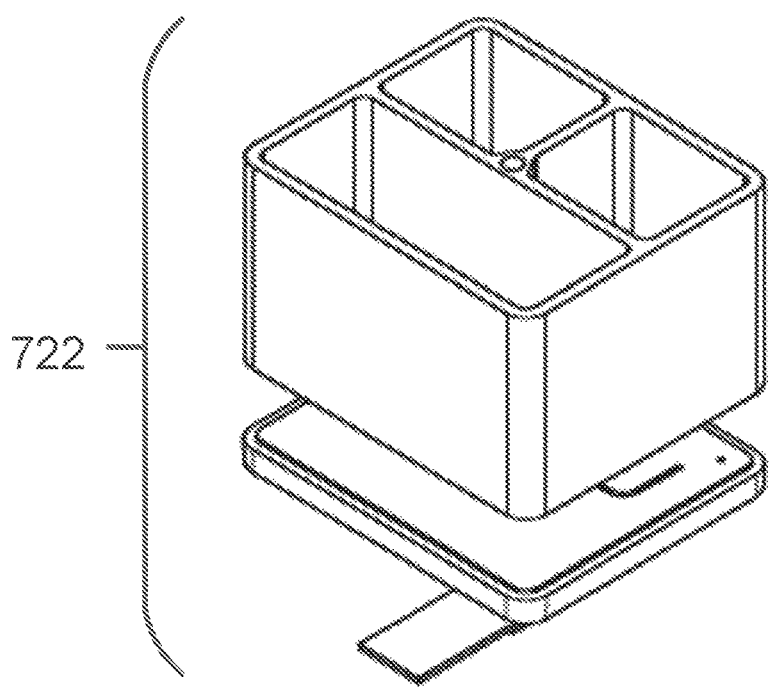
Figure 7C:
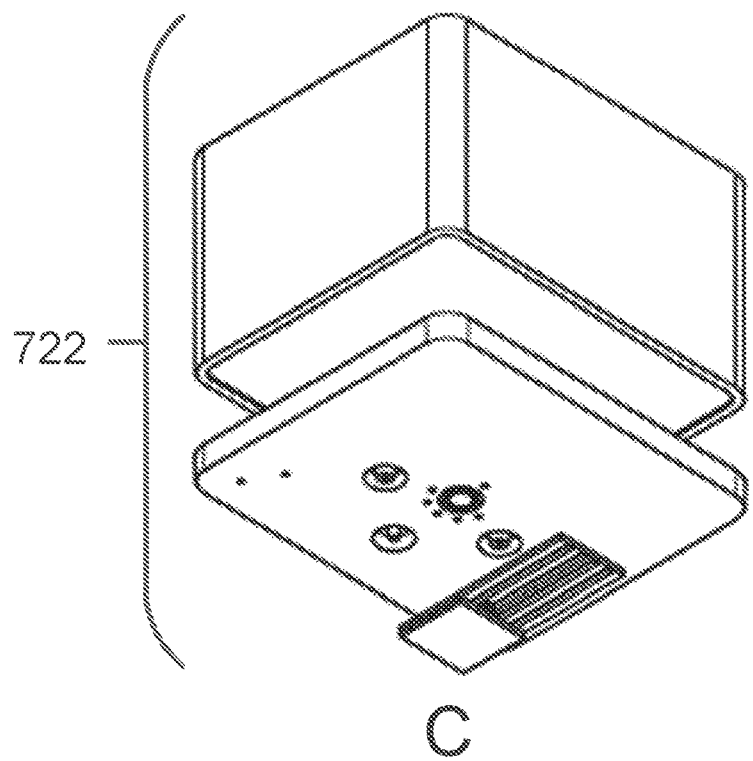
Figure 7D:
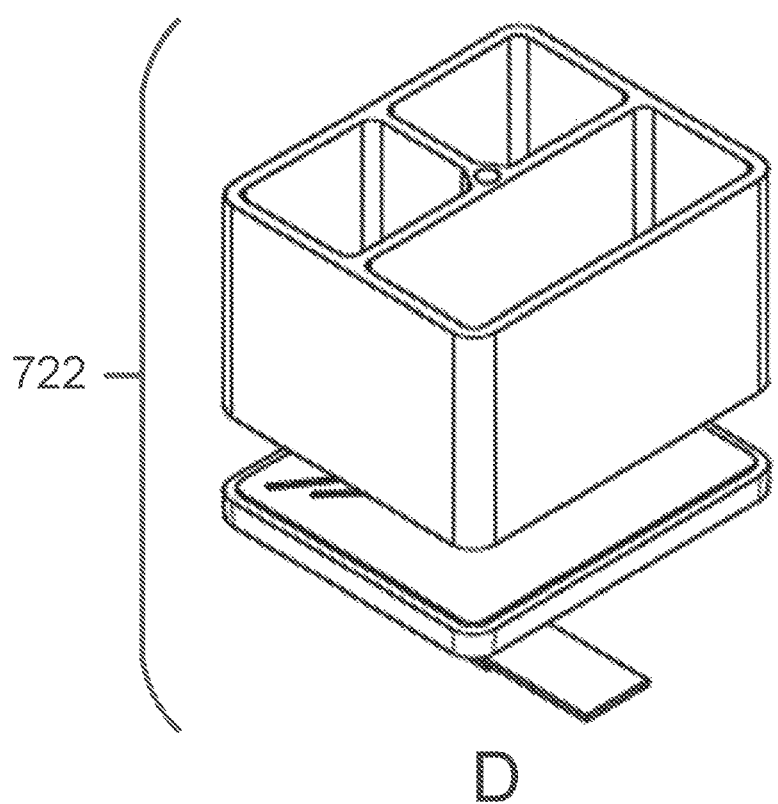

FIGS. 4A-4B show an exemplary microfluidic chip mold 418, with labelled connection points: sample collection, sample waste, carrier waste, carrier inlet, trigger inlet, and sample inlet.

FIGS. 5A-5C depict the assembly of an exemplary microfluidic chip 520 with a microfluidic chip mold 518, which may be similar to microfluidic chip mold of FIGS. 4A-4B. The microfluidic chip 520 includes a plurality of microfluidic channels 522 defined therein. The microfluidic substrate and mold can comprise a bioinert material that does not produce cytotoxic events in cells that traverse the microfluidic channels. In a preferred embodiment, the microfluidic substrate and mold are transparent to allow for optical imaging, fluorescent detection, and/or other optic detection and characterization. The microfluidic chip and mold can comprise any appropriate materials including acrylics, cyclin olefin polymers (COP) or copolymers (COC), and polycarbonate.

The microfluidic substrate comprises patterned electrodes that provide electrical contact for sensing and detecting particles in a sensing region. The electrodes may be made of any appropriate conductive material. In one embodiment, the electrodes comprise a copper adhesion layer and a platinum top layer. The patterned electrodes may be presented in any pattern so long as they provide contacts for sensing current changes across a sensing region of the microfluidic chip mold. In some embodiments, there may be two or more electrodes. For instance, the detector may be a two-point (e.g., two-electrode) detector, a three-point (e.g., three-electrode) detector, a four-point (e.g., four-electrode) detector, etc. (See U.S. Pat. No. 9,201,043, which is hereby incorporated-by-reference.)

The mold can comprise at least one microfluidic channel configured to be connected to the reservoirs in the cartridge body through the fluid vias in the faceplate.

The microfluidic substrate and mold may be made of any appropriate substance and by any appropriate method. In some embodiments, either or both may be injection molded. In some embodiments, either or both may be made of a rigid material such as plastic. The thickness of the microfluidic chip may be any appropriate thickness, including about 0.1, 0.2, 0.3, 0.4, 0.5, 0.6, 0.7, 0.8, 0.9, or 1 millimeter, or greater than 1 millimeter. The thickness of the microfluidic mold may be any appropriate thickness, including about 0.1, 0.2, 0.3, 0.4, 0.5, 0.6, 0.7, 0.8, 0.9, 1, or greater than 1 millimeter.

The microfluidic substrate and mold can comprise at least: (1) a microfluidic channel that enters the sensing region, (2) the sensing region, and (3) a microfluidic channel that exits the sensing region that has at least one sorting region comprising a trigger that can direct the flow of solution into a carrier microfluidic channel for single particle collection/isolation. As such, according to certain embodiments described herein, cell sorting is performed actively (e.g., via fluidic forces), rather than passively (e.g., via channel dimensions and/or composition). In some embodiments, the carrier channel is split into a plurality of microfluidic channels, each connecting the carrier channel to the sample collection outlet or to the carrier waste outlet. In some embodiments, a microfluidic channel connecting the carrier channel to the sample collection outlet or to the carrier waste outlet is externally valved through a connection with the interface and base plate. In some embodiments, such microfluidic channel valving improves collection drop volume creation by minimizing drop creation when no particle of interest is sorted while maximizing drop creation when a particle of interest is sorted.

The microfluidic substrate and mold comprise one or more inlets that are connected to the reservoirs in the body through the fluid vias in the faceplate. The sample reservoir is connected to at least one inlet in the microfluidic substrate and mold. Other inlets may be connected to the control buffer reservoirs.

A microfluidic channel runs from the sample inlet to a sensing region in the microfluidic chip. When a flow is provided, the liquid in the sample reservoir flows into the sample inlet and then enters the sensing region. In preferred embodiments, only fluids from the sample reservoir will flow through a sample inlet into the sensing region.

The sensing region can detect a characteristic and/or the presence of single cells and particles ranging in size from sub-micron to micron range or larger. In some embodiments, detection occurs using the Coulter principle. A cell or particle passes through a conduit in the sensing region. In some embodiments, a sensing region comprises a conduit proximal to one or more nodes. In such embodiments, the diameter of the conduit is smaller than the region or regions (node or nodes) of the microfluidic channel that enters and exits the sensing region such that a particle can cause electrical impedance/resistance when it enters the conduit. In other embodiments, the sensing region comprises no nodes. In other embodiments, the sensing regions comprises a plurality of nodes proximal to a plurality of conduits with smaller diameters. In such embodiments, there may be two, three, four, five, or more than five nodes. In some embodiments, a sensing region comprises a plurality of conduits, each conduit having an entrance and an exit proximate to a node. In some embodiments, a sensing region comprises a plurality of conduits, wherein less than every conduit entrance and/or exit is proximate to a node. In some embodiments, the sensing region can have one of the designs as described in U.S. Pat. No. 9,201,043, which is incorporated-by-reference. In other embodiments, the conduit has more than 2 nodes such that there are multiple events of electrical impedance and resistance.

In a preferred embodiment, the system is for single cell detection, sorting, and isolation. In this case, the diameter and height of the conduit is at least 30, 40, 50, 60, 70, 80, 90, 100, 110, 120, 130, 140, or 150 micrometers. The conduit must be large enough for a cell to pass through the conduit, but also small enough for a single cell or particle to cause electrical impedance/resistance of the current flowing between a pair of nodes of the conduit.

The range of cell diameters that can be detected by the present technology is broad and encompasses many important cell diameters in the field. For example, mature female eggs are among the largest cell types with about a 120 micrometer diameter. In terms of average volume (micrometer cubed), a red blood cell is 100, lymphocyte is 130, neutrophil 300, fibroblast 2,000, HeLa is 3,000, osteoblast 4,000, and an oocyte is 4,000,000.

It is envisioned that the technology may be used to detect and characterize particles smaller than a cell. An appropriately sized conduit may be used to detect and characterize any sized particles. Such particles may include bioparticles such as proteins, peptides, amino acids, lipids, fats, phospholipids, sugars, glycoproteins, sugar chains, nucleic acids, ribosomes, DNA, RNA, organelles, ribosomes, cellular vehicles, viruses, pores, pollen, cellular occlusions, precipitates, intracellular crystals, biological molecules, including viruses, antibodies, diabodies, etc., Fab fragments, binding proteins, phosphorylated proteins, aptamers, epitopes, polysaccharides, polypeptides, peptidoglycans, polymers, such as polystyrene beads, latex beads, colloids (e.g., metal colloids), magnetic particles, dielectric particles, crystals (e.g., micro-crystals or nano-crystals), and any other cellular components, particulates, fibers, impurities, contaminants and synthetic particles having a size range of 0.01 nm to 100 mm.

The conduit in the sensing region has an effective electrical impedance or resistance that is changed with the passage of each cell or particle therethrough.

Nodes for electrical detection provide for information ascertained by the Coulter Principle. The nodes are provided an electrical current by the patterned electrodes of the microfluidic chip, and other patterned electrodes provide sensing the current through the electrical detection nodes. In some embodiments, the patterned electrodes comprise a four-point electrode or four-point measurement comprising two inner and two outer electrodes. In certain embodiments, the outer electrodes provide a current (e.g., a constant current) into the conduit, and the inner electrodes detect changes in the electrical properties of the conduit (e.g., voltage). In other embodiments, the inner electrodes provide a current into the conduit, and the outer electrodes detect changes in the electrical properties of the conduit. In some embodiments, the outer electrodes provide a current to the conduit, and the inner electrodes regulate the voltage provided to the conduit but pass no current.

Optical and electrical sensing locations within a sensing region can be distributed in any appropriate manner. The optical sensing location or locations in the sensing region are aligned with the light pipe bores in the body and the faceplate such that it provides a "window of observation" for fluorescent detection.

The electrical sensing location or locations may be anywhere within the sensing region. In some embodiments, an electrical sensing region may overlap with an optical sensing location. In some embodiments, an electrical sensing location may reside between the sample inlet and the first optical sensing location. In some embodiments, an electrical sensing location may reside between the sorting region and the last optical sensing location. In some embodiments, an electrical sensing location may reside between two optical sensing locations.

In a preferred embodiment, the detection or sensing region has both optical and electrical sensing capability.

Figure 15:
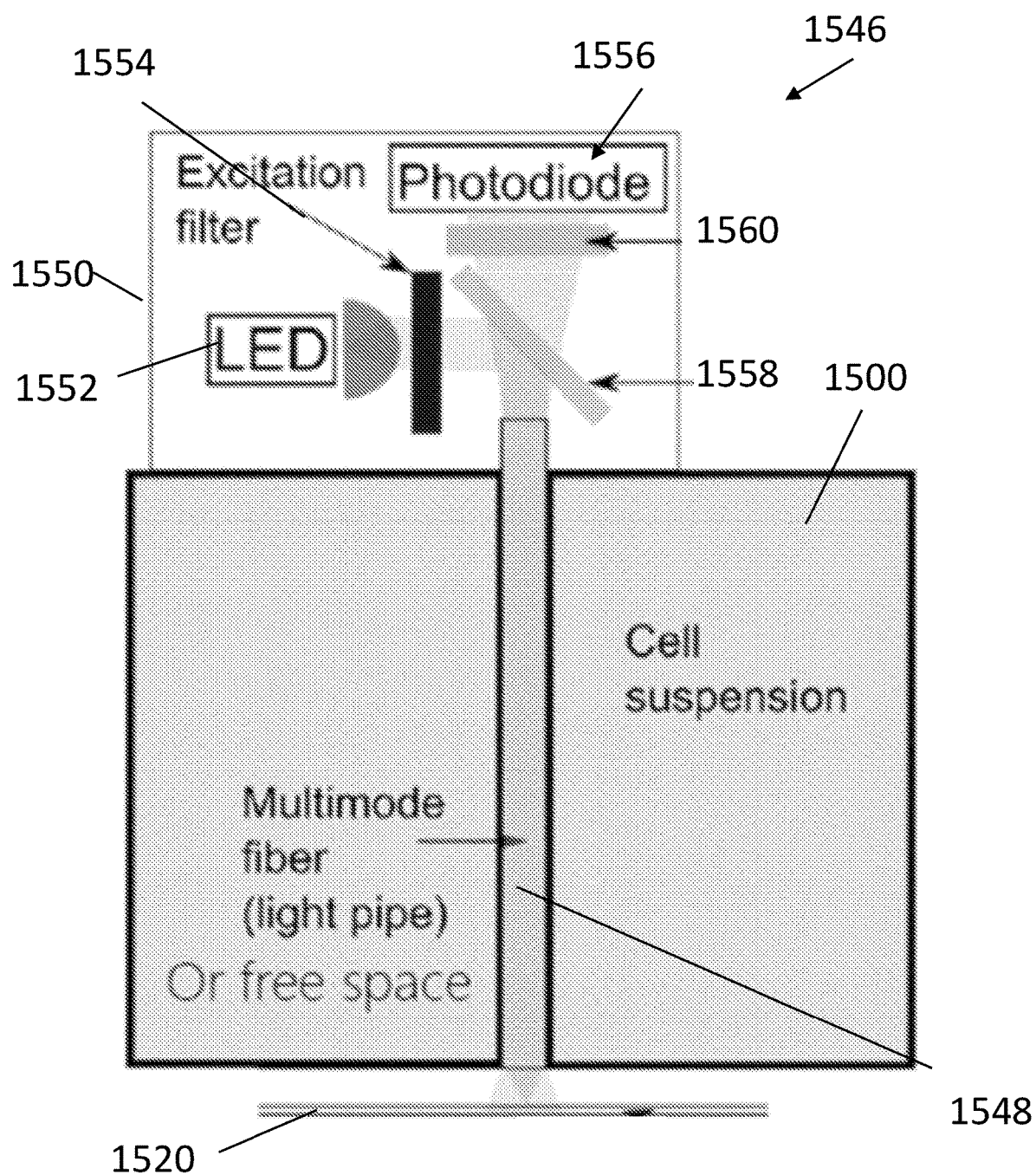
FIG. 15 is an embodiment of an LED-based fluorescent detection system, according to some embodiments.
Figure 16A:
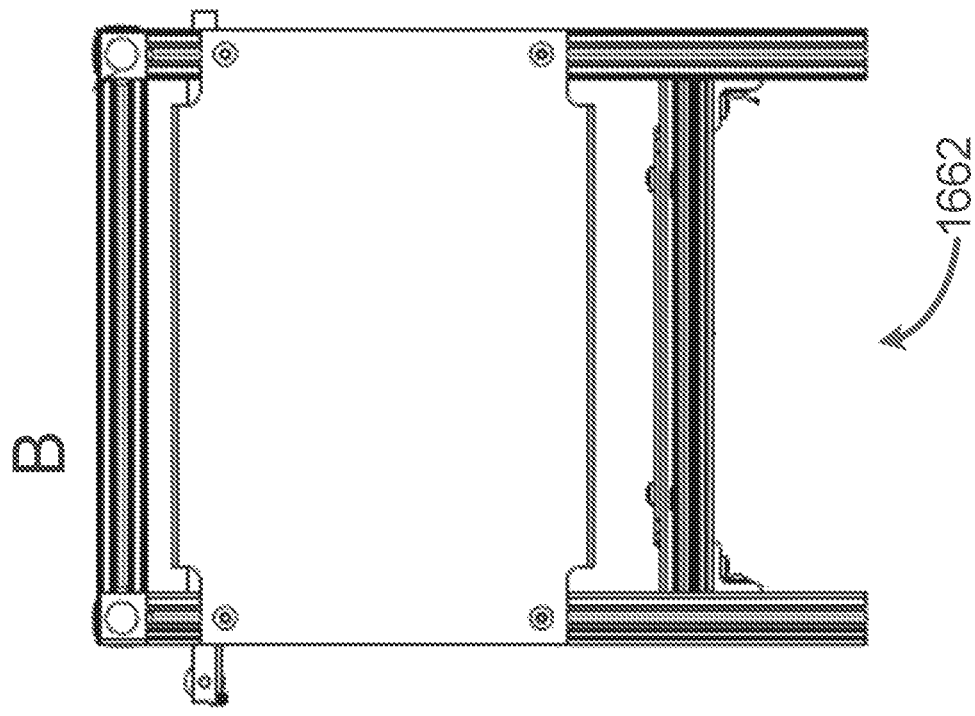
FIGS. 16A-16D depict an example of an overall system assembly, according to some embodiments.
Figure 16B:
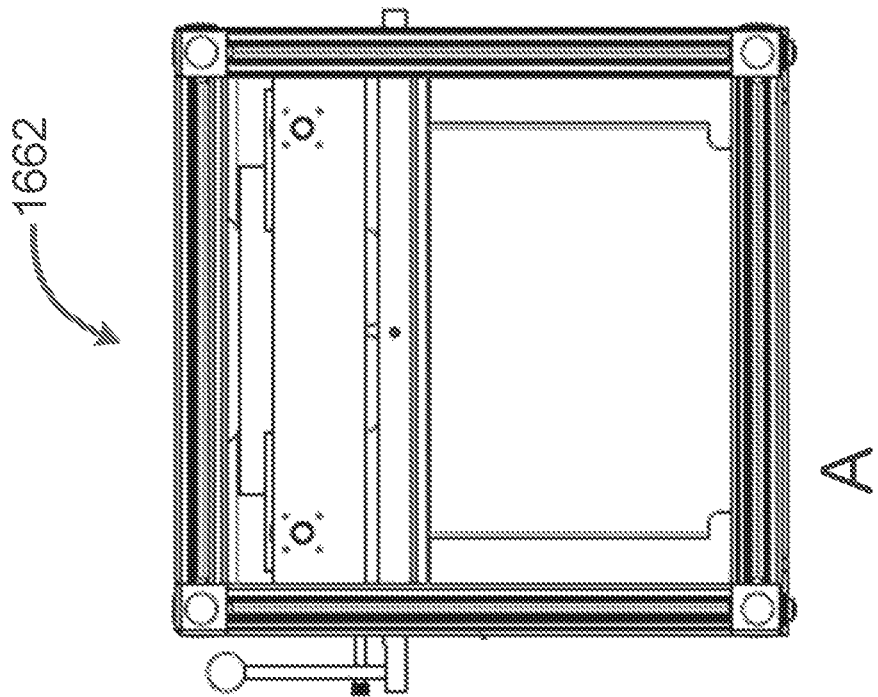
Figure 16C:
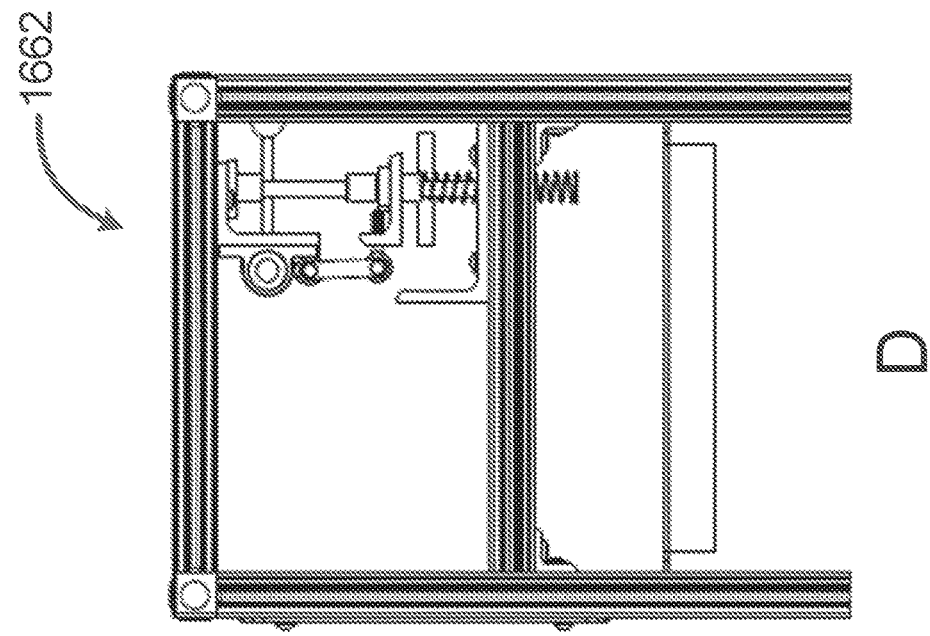
Figure 16D:
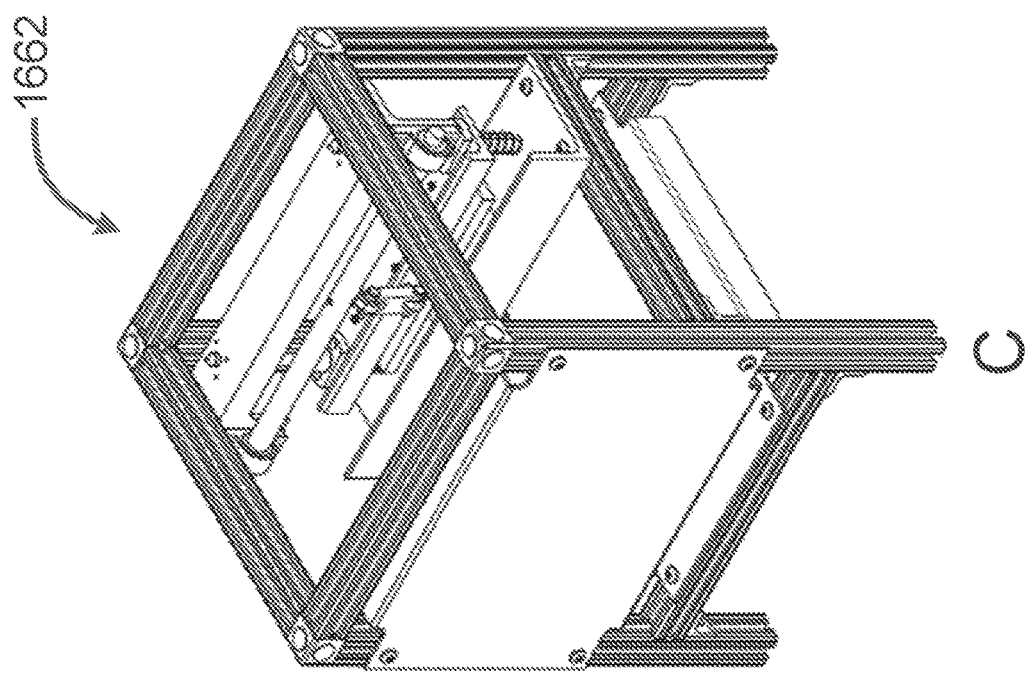

In one embodiment, the detection region has a segmented conduit that comprises one or more nodes and two or more sections. Fluorescent means can provide the optical sensing capability. A preferred embodiment of fluorescent means is shown in FIG. 15.

Simultaneous detection and characterization by electrical and optical signals provides the electrical signal or change in signal, the optical signal or change in signal, and a method to measure the velocity of the particle traversing the signaling site, increasing the accuracy of optical measurements. In some embodiments, this increased accuracy allows for each particle to be exposed to an excitation wavelength for less time. Less exposure to the excitation wavelength may reduce cytotoxic effects and photobleaching to particles (e.g., cells) of interest, boosting their viability and increasing ultimate yield.

A microfluidic channel exits out of the sensing region and connects to one or more sorting regions.

A sorting region comprises a microfluidic channel originating from the sample microfluidic channel and a branch point that results in two or more separate microfluidic channels.

In some embodiments, one or more of the microfluidic channels exiting a sorting region connect the sorting region to an outlet in the microfluidic substrate and mold. The outlet or outlets may be used for sample collection or waste. FIG. 4A provides an embodiment comprising a sample collection outlet, a sample waste outlet, and a carrier waste outlet. The outlets are connected to dispensing nozzles or dispensing holes 314 in the faceplate through fluid vias. Dispensing nozzles interface with the baseplate.

The sorting region may also comprise one or more intersections that connect one or more additional inlets to the sorting region. These additional inlets may be connected to the control reservoirs in the body.

In preferred embodiments, the sorting region comprises at least a microfluidic channel originating from the sample microfluidic channel, a trigger that can direct the flow of solution from the microfluidic channel originating from the sample microfluidic channel into a selected, carrier microfluidic channel.

In some embodiments, the trigger is provided at an intersection between the microfluidic channel originating from the sample microfluidic channel and a first microfluidic channel providing liquid from a control reservoir. FIGS. 4A-4B show one of the embodiments, where the intersection is connected to a trigger inlet by a microfluidic channel. Flow from the control reservoir, through the trigger inlet, and to the intersection provides the trigger flow.

When no flow or a low initial flow of liquid from the trigger inlet is provided, the sample liquid flows into a default branch of the intersection's branch point. In preferred embodiments the default branch leads to a sample waste collection. When a flow or an increased flow is provided from the trigger, the flow directs the sample liquid into a selected branch of the branch point.

The selected branch of the first branch point intersects at a second intersection with a carrier microfluidic channel. The carrier microfluidic channel is provided flow through a carrier inlet from a control reservoir. A plurality of microfluidic channels exit the second intersection. In a preferred embodiment, two microfluidic channels, a default branch channel and a selected branch channel, exit the second intersection. In preferred embodiments, the default branch leads to a carrier waste collection and the selected branch leads to a sample collection outlet. The carrier waste collection can be externally valved. The valve can be attached to the baseplate and connects the carrier waste to the baseplate through a channel in the interface plate. In some embodiments, when the valve is open, a majority of the carrier fluid enters the carrier waste branch and preferentially exits through the carrier waste. When the valve is closed, a majority of the carrier fluid enters the sample collection branch and preferentially flows into the sample collection outlet. The open/closed state of the valve is dependent upon the signal, signal change, lack of signal, or lack of signal change detected in the sensing region. In some embodiments, the valve control is automated.

The microfluidic nature of the exit channel requires significantly less fluid to advance sorted particles into an exit droplet than sorters with larger dimensions. In some embodiments, the total exit droplet volume is less than 10 microliters, 10 microliters to 15 microliters, or greater than 15 microliters. In preferred embodiments, the fluid volume used to advance sorted particles is less than or about 0.1 microliters in the microfluidic chip and less than or about 5 microliters within the interface plate channels. The reduction in required fluid increases the frequency of switching the branch as a given aliquot progresses through the microfluidic channels while ensuring that the aliquot comprises a single particle. This increase in switching frequency decreases the time required for a target particle to exit the cartridge as an isolate, thereby increasing the overall throughput.

FIGS. 6A-6G show an assembled microfluidic chip 620 and microfluidic chip mold 618, with detection and sorting regions. In the depicted embodiment, the detection or sensing region has both optical sensing (e.g., fluorescent sensing) and electrical sensing capability. A fluorescent sensing embodiment is shown in FIG. 15.

In some embodiments, optical sensing occurs prior to the particle entering an electrical detection or sensing location. In some embodiments, optical sensing occurs after the particle has exited from an electrical sensing or detection location. In embodiments where the electrical sensing is used to trigger an LED or other light source, optical detection occurs after electrical sensing.

In some embodiments, the microfluidic chip comprises a sensing region comprising one or more nodes proximal to a conduit, as depicted in FIGS. 5A-6G. In some embodiments, the microfluidic chip comprises a plurality of nodes proximal to one or more conduits. For example, FIGS. 5A-6G depict an embodiment of a microfluidic chip comprising a sensing region comprising a conduit proximal a node on either side. In some embodiments, a microfluidic chip comprises a sensing region with no nodes. In some embodiments, a microfluidic chip comprises a sensing region or sensing regions comprising a plurality of nodes, including more than two, more than three, more than four, or more than five nodes. In some embodiments, one or more of the nodes comprise functionalized surfaces. In some embodiments, none of the nodes comprise functionalized surfaces.

The volumes of the microfluidic channels can be described as cylindrical, prismatic, conical, or any other geometry or any combination of geometries. As depicted in the figures (by way of example only), the microfluidic channels are rectangular prisms. The effective diameter of the channel connecting the sample inlet and the sensing region in the figures is 0.35 mm, the effective diameter of the channel entering and exiting the sensing region where a particle is electrically detected and characterized is 0.035 mm, and the effective diameter of the node within the sensing region where a particle is electrically detected and characterized is 0.105 mm. In the depicted exemplary embodiment, the distance from the sample inlet to the sensing region about 3.4 mm, the length of the sensing region is about 0.105 mm, and the length of the channel connecting the sensing region to the sorting region is about 1.7 mm. It should be understood that these dimensions are meant as examples only and are not limiting.

FIGS. 7A-8I are an exemplary cartridge assembly, including a combination of components described above with reference to FIGS. 2A-6G.

Figure 9A:
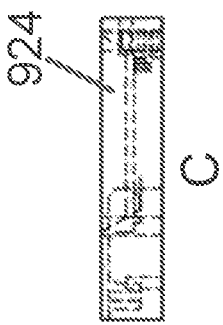
Figure 9B:
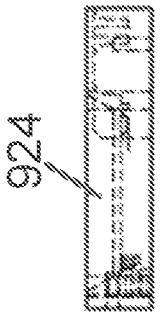
Figure 9C:
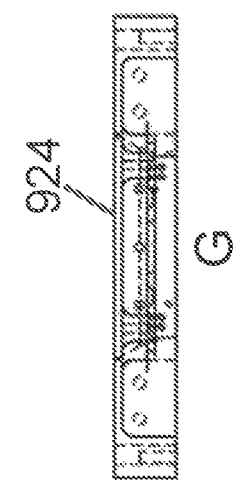
Figure 9D:
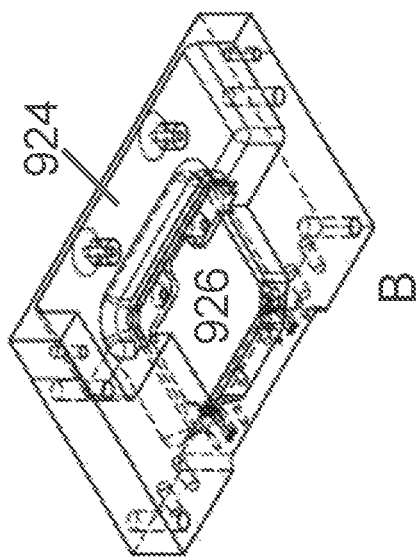
Figure 9E:
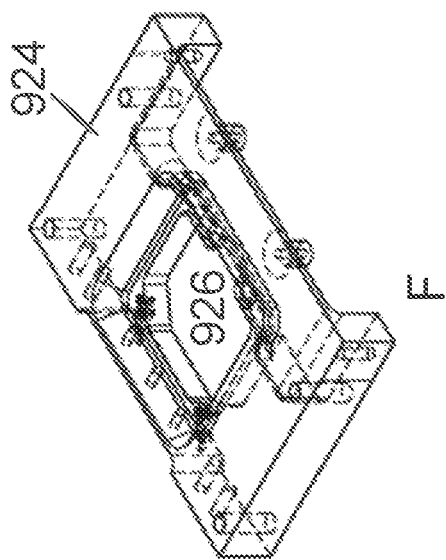
Figure 9F:
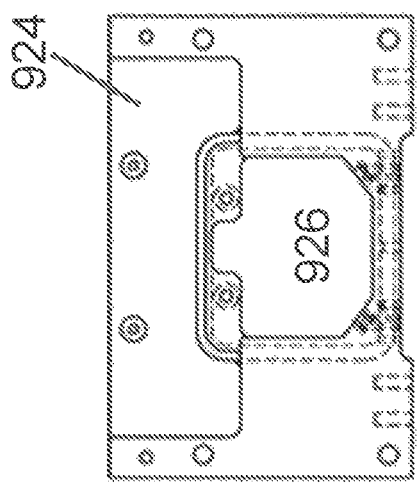
Figure 9G:
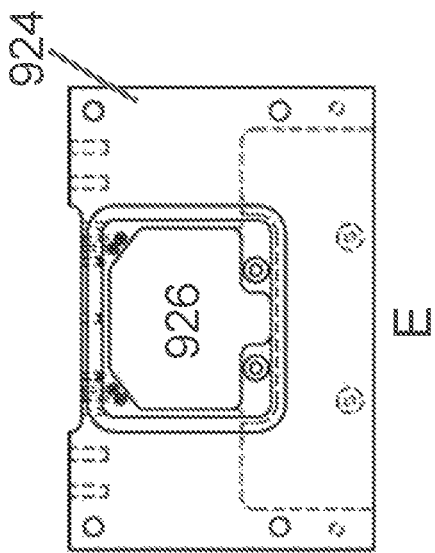

FIGS. 9A-9N are an exemplary base plate of an associated hardware platform. The base plate 924 includes mounting locations (or "mounts") on its underside that are configured to interface with a hardware platform and/or electronics board. In some embodiments, the cartridge assembly docks in a cartridge alignment cradle 926 of the base plate, thereby connecting it to access valves through liquid vias. As shown in FIGS. 9A-B and 9E-9F, the cartridge alignment cradle 926 can comprise a clear (unobstructed) location for collecting a sample.

Figure 10A:
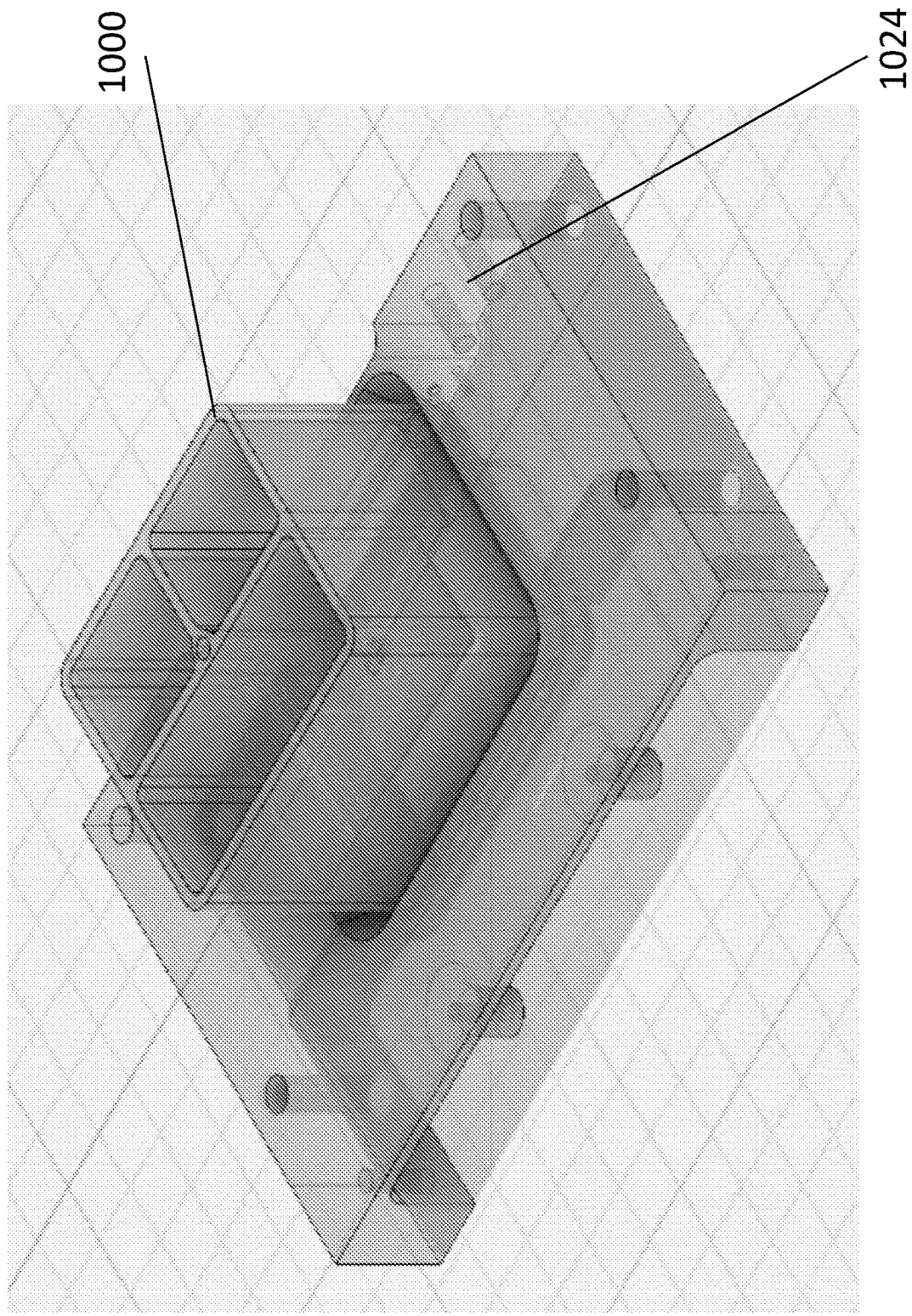
FIGS. 10A-10B illustrate a cartridge mated with a base plate of a hardware platform, according to some embodiments.
Figure 10B:
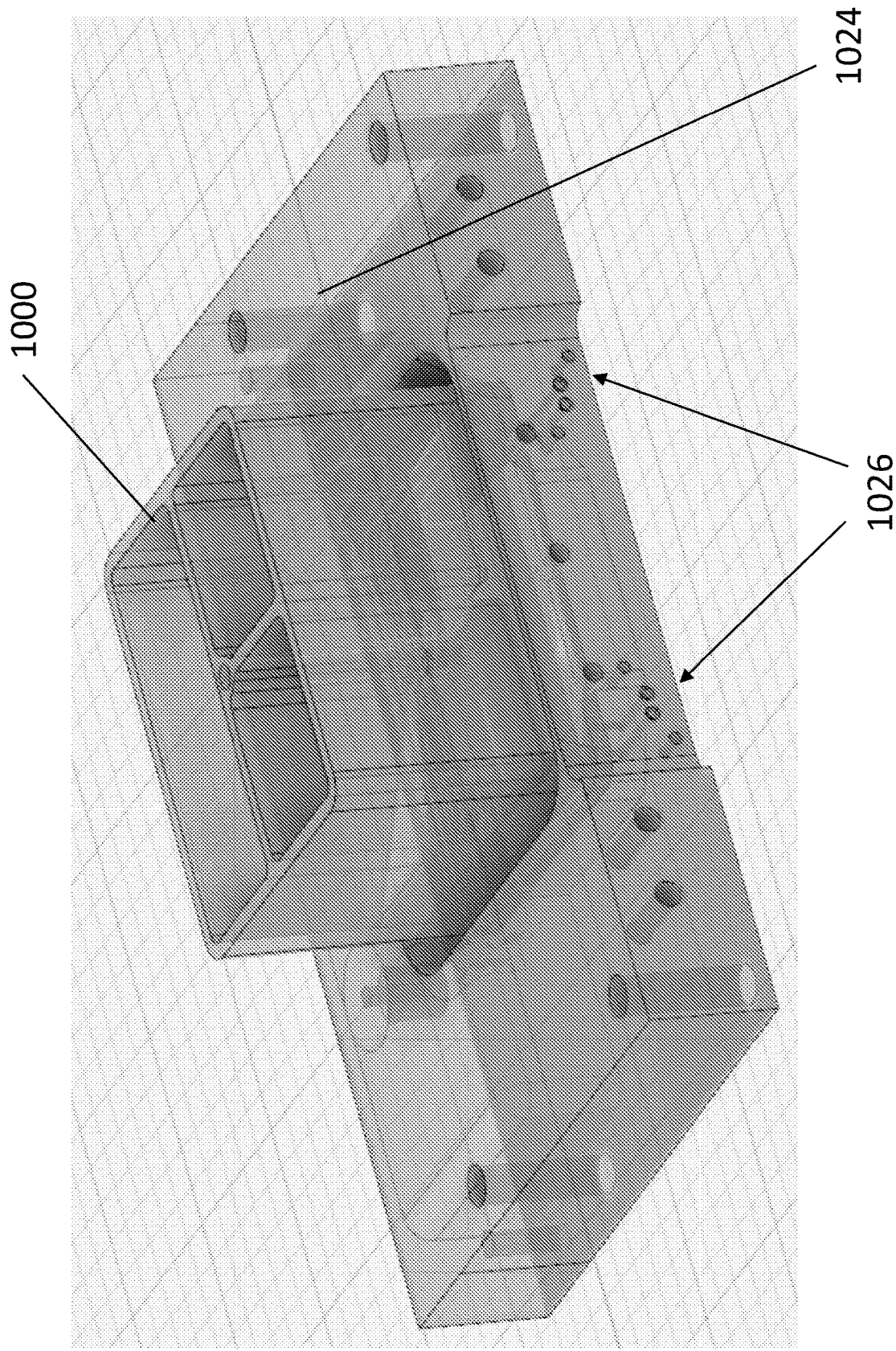
Figures 11A, 11B, 11C, 11D, 11E, 11F:
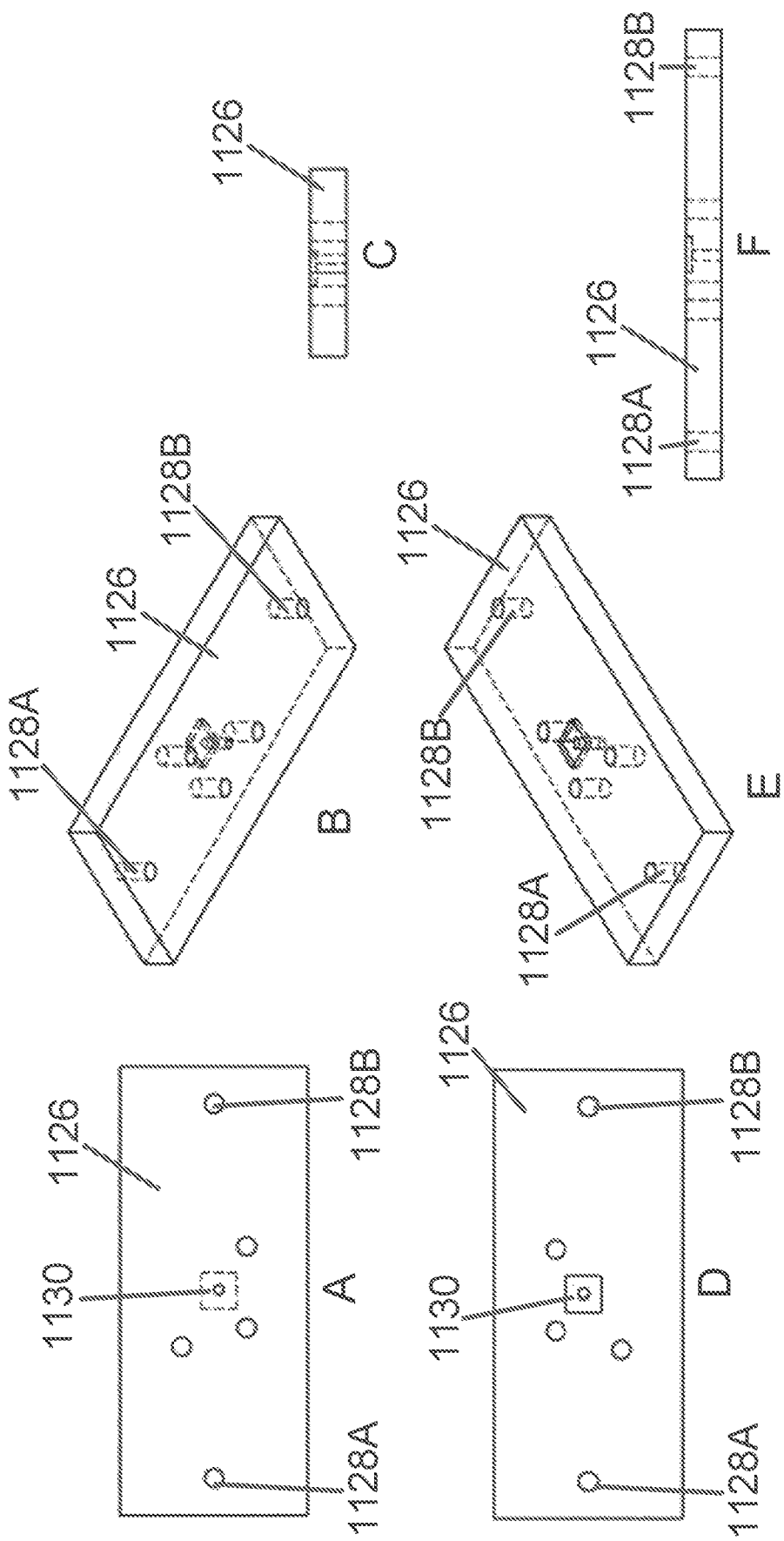
FIGS. 11A-11L illustrate a lid with a sealing surface, according to some embodiments.
Figures 11G, 11H, 11I, 11J, 11K, 11L:
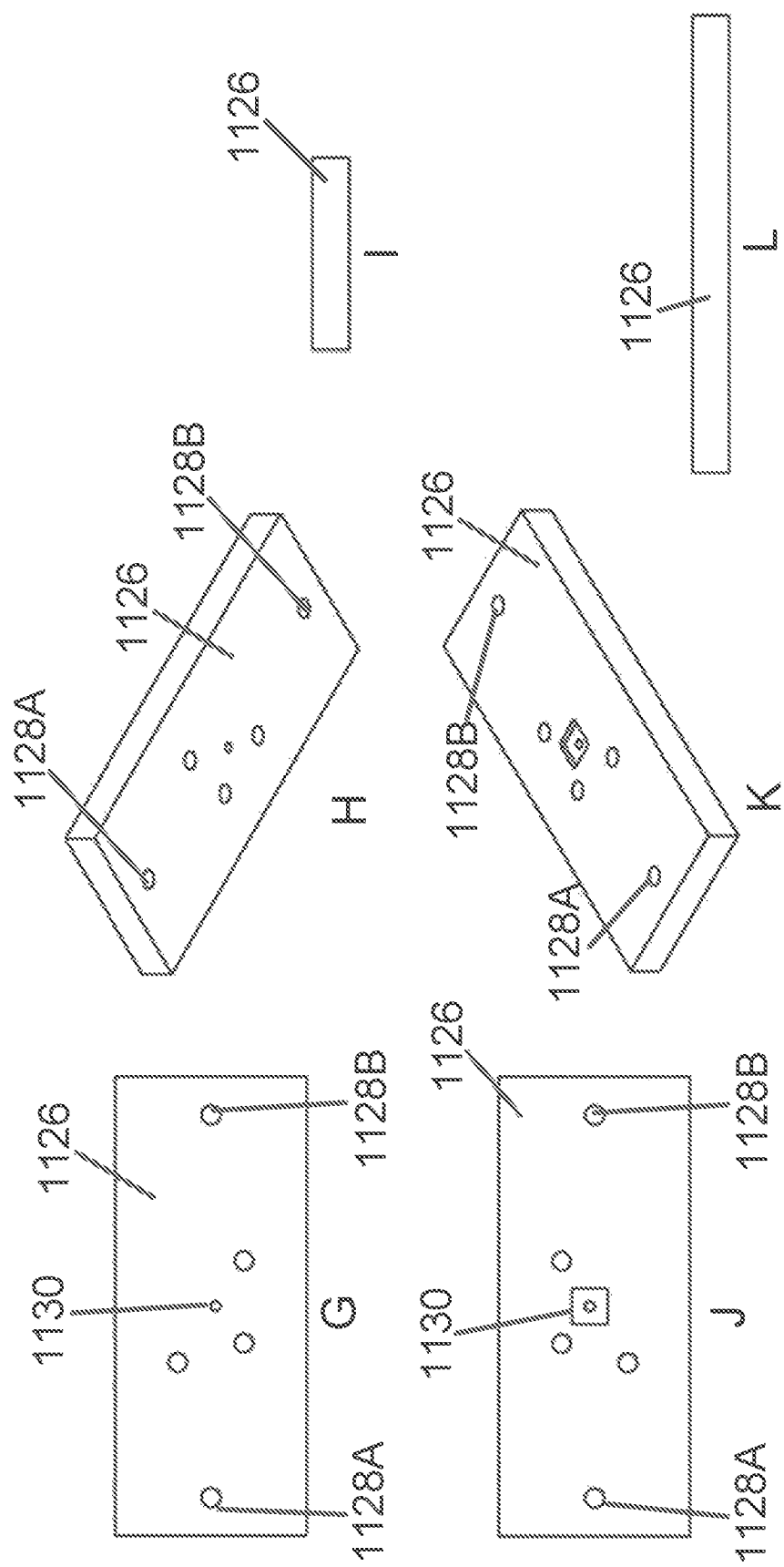
Figures 12A, 12B, 12C, 12D, 12E, 12F:
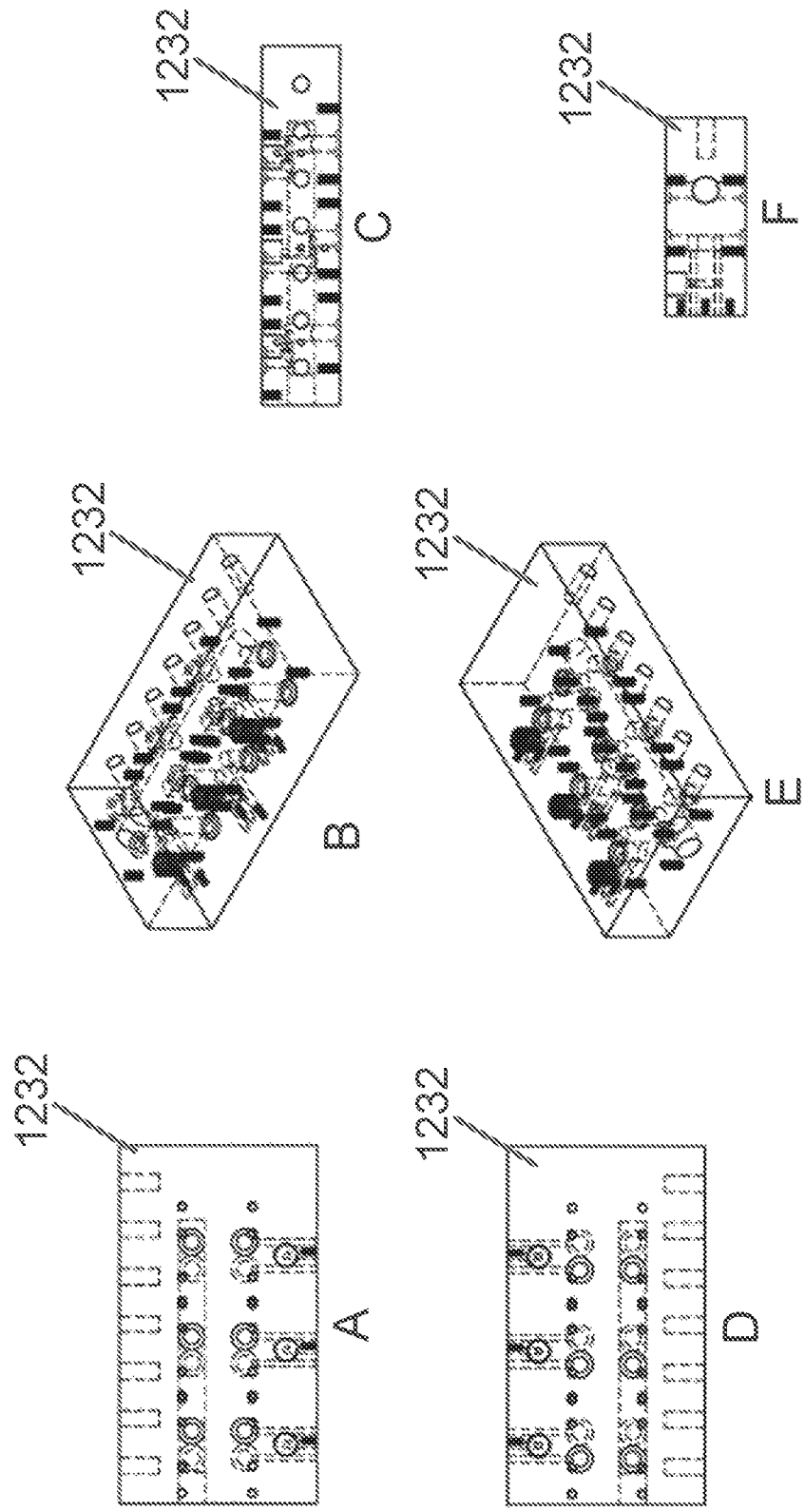
FIGS. 12A-12L illustrate a pressure regulator manifold, according to some embodiments.
Figures 12G, 12H, 12I, 12J, 12K, 12L:
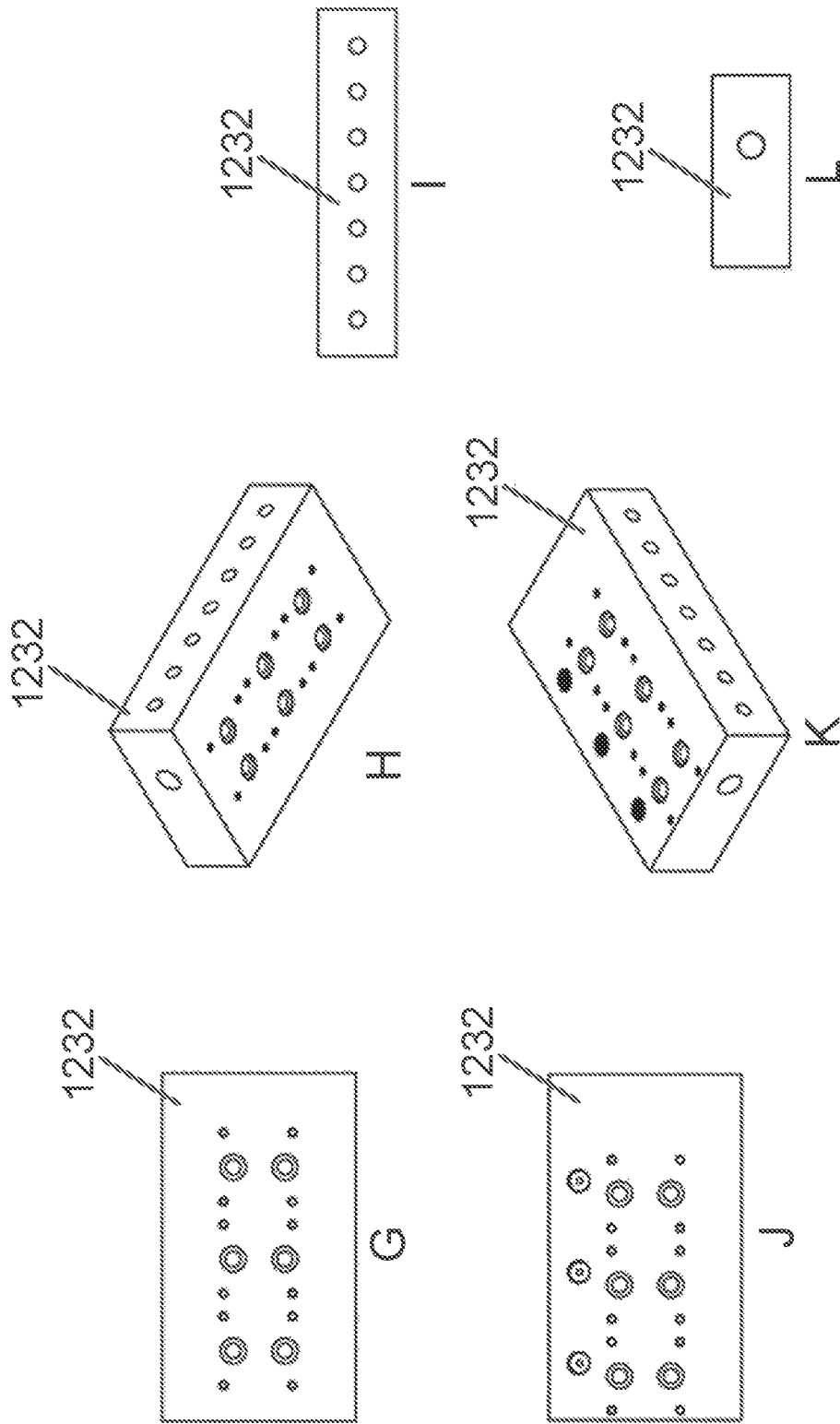

FIGS. 10A-10B depict an exemplary cartridge 1000 mated with an exemplary base plate 1024 of a hardware platform. FIG. 10A depicts a cartridge 1000 that has been placed into the base plate 1024 of the hardware platform (the remainder of the hardware platform is not shown).

FIG. 10B shows exemplary locations 1026 of valve manifolds in the base plate 1024.

The cartridge trigger reservoir can be connected to a valved port in the base plate 1024 of the hardware platform, and carrier waste is routed to a valved port in the base plate 1024. In some embodiments, connections are made using o-ring sealing. FIG. 10B depicts an embodiment where the trigger reservoir of the cartridge 1000 is connected to the base plate 1024 using o-ring sealing.

FIGS. 11A-11L show an exemplary lid 1126 with a sealing surface. In some embodiments, the lid is separate from the cartridge and serves as a top plate that is positioned atop the cartridge assembly. In other embodiments, the lid 1126 is part of the cartridge. In some embodiments, the lid is disposable. In the depicted embodiment of FIGS. 11A-11F, this is accomplished using linear bearing ports 1128A and 1128B, which pass through the lid 1126 at sites near the lid's edges.

Pressure applied to the chambers in the cartridge may be controlled using the pressure access ports that traverse the lid.

The top of the lid 1126 of FIGS. 11A-11F defines a light filter cube recess 1130 for positioning an optic system. When positioned, the optic system is aligned with a light access and filtration core within the light filter cube recess 1130 that traverses the lid. Through this access core, the optic system can access the light pipe or light bore running through the cartridge (see, e.g., FIG. 15).

FIGS. 12A-12L depict an exemplary pressure regulator manifold. The pressure regulator manifold 1232 bolts onto the hardware platform to drive the pressure inputs into the cartridge. The manifold can be attached to the hardware platform in any manner that allows for the application of air pressure to the cartridge cavities through the manifold's regulators. In a preferred embodiment, when air pressure is applied through the pressure regulator manifold's regulators, the top plate of the instrument or a lid covers the cartridge cavities.

The pressure regulator manifold 1232 depicted in FIGS. 12A-12L is configured to provide 3-way valve access for solution flow. It further comprises a main pressure inlet on its side and regulated pressure out ports on its top to control the pressure-driven flow of the solutions in the cartridge's chambers.

FIG. 13 depicts an exemplary subsystem 1334 layout. FIG. 13 shows the assembly of a top plate 1326 (e.g., as described above with reference to FIGS. 11A-11L), a cartridge bearing a microfluidic chip substrate and mold 1336 (e.g., including a cartridge body as described above with reference to FIGS. 2A-2I, and a microfluidic chip substrate and mold as described above with reference to FIGS. 4A-6G), a base plate 1324 (e.g., as described above with reference to FIGS. 9A-9N) with electrical sensing contacts 1340, and a collection module 1344, shown in FIG. 13 to comprise a 96-well plate output container 1342. Other elements of the subsystem are not shown.

FIGS. 14A-14C are a schematic representation of the fluid paths in the exemplary subsystem depicted in FIG. 13. In the depicted embodiment, when a new cartridge is used, the solution sample fluid path does not interact with any surfaces that were previously contacted with sample fluid loaded into an earlier cartridge.

FIG. 14A shows a trigger line fluid path running from trigger cavity in the cartridge to the microchip trigger inlet. In this embodiment, the flow of solution is controlled by a valve indicated as an "X" in FIG. 14A.

FIG. 14C shows a carrier line fluid path of the solution loaded into the carrier cavity in the cartridge. Dependent on the flow of fluid in the carrier line and whether the valve (depicted as an "X" in FIG. 14C) is open or closed, the carrier fluid will either preferentially flow to the upper, sample collection path or the lower, waste path. In preferred embodiments the fluid in the carrier line is directed to the collection or waste path in response to a signal or signals detected as a particle is in the sensing region or regions of the microfluidic chip.

FIG. 14B shows a fluid path of the solution in the sample cavity of the cartridge. Dependent on the flow of the fluid from the sample line and the trigger line, the sample solution will flow to the upper, waste path or to the lower sample, collection path. In preferred embodiments, the direction of the sample solution is determined in response to a signal or signals detected as a particle is in the sensing region or regions of the microfluidic chip.

FIG. 15 is an embodiment of an LED-based fluorescent detection system 1546. The grey rectangles depict the cartridge 1500. The central column 1548 depicts the light pipe or light bore ("multimode fiber" or "free space", according to some embodiments) that runs through the vertical length of the cartridge 1500 and is positioned above the sensing region of a microfluidic channel of a microfluidic chip 1520. Above the light pipe 1548 is a dichroic mirror 1558 and fluorescent emission and/or detection assembly 1550 that includes a quantitative fluorescence remote-access detector (photodiode 1556 with fluorescent filter 1560 in some embodiments). A light source (LED in some embodiments) surface emitter 1552 is filtered by excitation filter 1554 to isolate the excitation wavelength (e.g., blue, however other wavelengths can be used).

FIGS. 16A-16JD depict an example of an overall system assembly 1662.

FIG. 17 shows an exemplary scheme 1764 for detection and/or sensing and isolation. The arrow in the "carrier" row depicts the flow direction of a solution that will carry a sorted particle of interest to a collection device. This carrier row depicts a microfluidic channel that is within the microfluidic chip (see, e.g., FIGS. 6A-6G). In some embodiments, the particle-bearing solution is the sole means by which the particle(s) of interest are carried (i.e., no sheath or other additional liquid is used).

A cartridge is designed to align its microfluidic architecture with the sensing/detection module and the collection module of the hardware platform.

The arrow in the "sample" row depicts the flow direction of a solution that carries particles from the sample reservoir of the cartridge. This sample row depicts a microfluidic channel that is within the microfluidic chip stage of the cartridge. Sample particles pass through the "sensing region" one-by-one. Each particle is interrogated in the sensing region, preferably by a combination of electrical and fluorescent detection elements. Combined electrical and fluorescent signals from the particle are analyzed and the particle is identified. If the particle is identified to be a particle of interest, a trigger is activated that directs the flow of solution into the carrier microfluidic channel such that the particle of interest can be collected/isolated. In some embodiments, the trigger directs the sample solution by altering the solution flow. In some embodiments, the trigger introduces a crossflow of buffer or liquid to direct the sample solution.

Combined with unique device geometries in the sensing region, signal processing algorithms calculate the electrical and/or fluorescent signals from the particle resulting in a high sensitivity of detection and dynamic range while tracking every particle. Active isolation triggers and collects each particle of interest in a manner that maintains particle integrity, e.g. cell viability.

Functional Capabilities

No prior live particle isolation system can be used to provide all of the following features of the instant technology: recovery, single-cell isolation efficiency, capability of using a heterogeneous sample input, purity, the preservation of particle integrity, capability of using a broad sample input volume, speed of function, contamination-free operation, and degree of automation.

The instant technology allows for separately or individually detecting and characterizing any or all particles in a sample. After a particle is detected or characterized, it can be directed/routed for collection or removal from the sample output. In some embodiments, optical and electrical detection and characterization of individual particles in solution allows for the recovery of rare particles or cells in solution. In some embodiments, the rare particles may be diluted in solution. In some embodiments, rare particles are not diluted in solution. In some embodiments, the solution may comprise rare particles as well as common particles in greater abundance. In some embodiments, the rare particles may be cancer cells, circulating cancer cells, blood cells, white blood cells, stem cells, transformed or transfected cells, or other cells or cell types. In some embodiments, the rare particles may be cells that overexpress one or more cell surface proteins. In some embodiments, the rare particles may be cells that overexpress one or more intracellular proteins. In some embodiments, the rare particles may be characterized by size. In some embodiments, the rare particles may be characterized by a combination of size and protein marker profile. In some embodiments, the particles are detected and not characterized. In some embodiments, the particles or cells may be at low concentrations or physiologically relevant concentrations. In some embodiments, the system can operate with only optical detection or only electrical detection.

Embodiments described herein allow for efficient single-cell isolation. In a preferred embodiment, combined electrical and optical detection algorithms control microfluidics for highly accurate single cell sorting of a desired cell phenotype from heterogeneous samples.

The efficiency of single-cell isolation can be defined as the number of desired (and, optionally, viable) single cells that are successfully deposited into individual wells in a microtiter plate (e.g., a 96-well plate), or any other receptacle. For example, 90 wells on a 96-well plate having single cells would result in a "yield" or "isolation efficiency" of 93.75%. In some embodiments, combined electrical and optical detection results in an isolation efficiency of greater than 90%, greater than 91%, greater than 92%, greater than 93%, greater than 94%, greater than 95%, greater than 96%, greater than 97%, greater than 98%, or greater than 99%.

The input sample can be a solution or mixture comprising a homogenous or heterogeneous population of particles or cells. If the sample is heterogeneous, the particles of interest may be a majority or a plurality or a minority of the particles in the mixture. In some embodiments, the particles of interest are a substantial majority of the particles in the mixture. In some embodiments, the particles of interest are about 50% of the particles in the mixture. In some preferred embodiments, the particles of interest are a minority of the particles in the mixture. The ratio of particles of interest to total particles in the mixture can be less than 1:1, less than 1:10, less than 1:100, less than 1:1000, about $1:10^6$, about $1:10^7$, about $1:10^8$, about $1:10^9$, about $1:10^{10}$, about $1:10^{11}$, about $1:10^{12}$, or less than $1:10^{12}$. For example, cancer cells or circulating tumor cells can be detected from a blood sample where the target cells are present on the order of one target cell per millions of background (non-target) cells.

Sorting and isolating uses of the instant technology result in a high purity output. In one embodiment of dual detection, combined electrical (NPS-based) and LED-based fluorescent detection reduces detection of false positives. Depending upon the implementation, using systems or methods described herein can result in a reduction of false positives such that false positives constitute less than 10%, less than 9%, less than 8%, less than 7%, less than 6%, less than 5%, less than 4%, less than 3%, less than 2%, or less than 1% of the total isolated cells-of-interest. In some embodiments, an LED-based excitation source or sources are used. In some embodiments, a laser-based excitation source or sources are used. In embodiments where single particles are isolated in buffer, this high purity results in greater than 90%, greater than 91%, greater than 92%, greater than 93%, greater than 94%, greater than 95%, greater than 96%, greater than 97%, greater than 98%, or greater than 99% of the receptacles used for output collection containing a single target particle. In embodiments where target particles are sorted, this high purity results in the target particles being greater than 90%, greater than 91%, greater than 92%, greater than 93%, greater than 94%, greater than 95%, greater than 96%, greater than 97%, greater than 98%, or greater than 99% of all sorted particles in an output sample or samples.

Due to the capability of the system to have "bench-top" dimensions, the system can be placed in a small sterile environment such as a fume hood or a culture hood. This further ensures the purity and/or contamination-free nature of the sample.

The preservation of particle integrity and single-particle isolation enables additional downstream confirmation and characterization of the particles. Viability of cells can be validated, for example, using live/dead assays such as Trypan Blue or Propidium Iodide dyes and microscopy, or CellTiter™, or by culturing. In embodiments where the particles are viable cells, the technology enables founding homogenous, clonal colonies from a single-cell isolate. Phenotype calling with such colonies ensures calling uniformity and reproducibility. Phenotyping techniques are known in the art and include PCR, Sanger sequencing, next-generation sequencing, antibody-based staining, and microscopy. In some embodiments, the phenotyping of sorted cells is used to confirm proper isolation and sorting. In some embodiments, phenotyping is used to characterize cellular properties that founder isolates were not originally sorted by.

No prior incubation or binding steps are necessary for single-particle detection and isolation. In some embodiments, the particle comprises a fluorescent reporter tag. In some embodiments, the particle may be a cell or transfected cell comprising the fluorescent reporter tag. In some embodiments, the fluorescent reporter tag is an expressed fluorescent protein such as green fluorescent protein (GFP). In some embodiments, a particle comprising a fluorescent reporter tag may allow for staining-free optical detection. In some embodiments, the excitation source (e.g. an LED) is coupled to the electrical detection of a particle or cell, such that the excitation source is selectively activated dependent upon the electrical detection and/or characterization profile of a particle or cell. Photobleaching and cytotoxic events are reduced by limiting exposure to an excitation source through this coupling, leading to increased cell viability compared to traditional cell detection, characterization, and sorting techniques.

The present technology permits sample volumes from 1 microliter to greater than 10 milliliters to be used, thereby removing the need for concentration or dilution steps. FIGS. 2G-2I depict an exemplary sample reservoir with a maximum sample volume of about 10 milliliters. However, the maximum sample volume can be any volume that the sample reservoir can hold, and there are no limits to the size of the sample reservoir. In some embodiments, the sample reservoir may contain more than 10 milliliters, 15 milliliters, 20 milliliters, 30 milliliters, 50 milliliters, 100 milliliters, or 1 liter. The sample volume can also be less than 10 milliliters. In some embodiments, the sample volume can be less than 10 milliliters, less than 5 milliliters, less than 1 milliliter, less than 100 microliters, less than 50 microliters, less than 25 microliters, about 10 microliters, about 1 microliter, or less than 1 microliter.

The sorting of the instant technology can detect, characterize, and sort or isolate particles at high speeds. The rate can be altered by adjusting the concentration of particles in the sample and the flow rate of particles through the microchip. In some embodiments, particles of interest in a heterogeneous population can be isolated at rates of about less than 1 particle per minute, 1 particle per minute, 10 particles per minute, 100 particles per minute, 1000 particles per minute, about 10,000 particles per minute, about 100,000 particles per minute, or greater. In some embodiments, particles in a heterogeneous sample can be sorted (i.e. target particles are collected separately from non-target particles) at rates of about less than 1 particle per minute, 1 particle per minute, 100 particles per minute, 1,000 particles per minute, 10,000 particles per minute, 100,000 particles per minute, 1 million particles per minute, 10 million particles per minute, 100 million particles per minute, 1 billion particles per minute, or greater. In some embodiments, particles of interest in a homogeneous population can be isolated at rates of less than 1 particle per minute, 1 particle per minute, 10 particles per minute, 100 particles per minute, 1000 particles per minute, about 10,000 particles per minute, about 100,000 particles per minute, or greater.

The present technology is capable of complete automation after sample loading, buffer loading, and software parameter input is provided to the system. This allows for high-speed, high-efficiency, automated detecting, characterizing, sorting and isolating particles of interest.

System Operation and Workflow for Particle Isolation

Sample and Buffer Loading into Cartridge

A liquid sample containing the cell(s) or particles of interest are introduced or loaded into the cartridge. In the exemplary cartridge depicted in FIGS. 2A-2I, the liquid sample is introduced into the sample reservoir compartment.

The liquid sample can have a volume as small as 1 microliter. The maximum volume of the liquid sample is limited only by the overall size of the cartridge, which is designed relative to the overall size of the hardware platform. In one embodiment, the maximum volume of the liquid sample is 10 milliliters. The liquid sample can have a target particle concentration of 0.1 particle per milliliter to 10,000,000 particles per milliliter.

In one embodiment of the cartridge, the sample reservoir can hold up to 10 mL or more of solution (see, e.g., FIGS. 2A-2I for a picture of the sample reservoir).

Running buffer solutions are also added to the cartridge. In one embodiment of the cartridge, there are two "control reservoirs" into which running buffer solutions are added. For example, one such control reservoir can provide a carrier flow while the other can provide a trigger flow, as discussed above. The running buffer solutions can be cell culture media, phosphate buffer saline, oil, or any solution desired for output.

Cartridge Placed into Base Plate of Hardware Platform

By placing the cartridge into the base plate of the hardware platform, a clamping mechanism mates the cartridge to electrical, pneumatic, fluorescent, collection, and waste subsystems of the hardware platform (see, e.g., FIGS. 16A-16D.) The vertical alignment of the valve manifold locations between the cartridge and the hardware platform can benefit the control of the flow or dispensing rate.

Operation Commencement

The pneumatic subsystem is activated in a manner that first causes an air pressure change in the sealed cartridge. The air pressure change causes solution to flow from the sample reservoir through fluid channels of the interface plate to the microfluidic channel in the microfluidic chip of the cartridge. Solution flow from the sample reservoir causes particles to travel into the microfluidic channel. Pressurized air is supplied to the reservoirs through pressure regulators. The pressure can be controlled, supplied, and tuned individually. In some embodiments, the pressure supplied to one reservoir is adjusted in response to its effect on the flow from a different reservoir. In some embodiments, each reservoir has an independently controlled regulator.

Sensing and Detection

As the particle-laden sample solution flows through the microfluidic channel, the solution passes through one or more sensing regions of the microfluidic channel. In some embodiments, the sensing region has a smaller diameter or width than non-sensing regions of the microfluidic channel. The sensing region can include an orifice having a shape that is spherical, square, rectangular, a polygon, or a combination of overlapping edges of these, or any other possible cross-section that is large enough for particles to traverse. Using electrical (e.g., AC and/or DC current) and/or optical detection (e.g., single wavelength or multi-wavelength), the presence of one or more particles of interest can be detected. In preferred embodiments, electrical detection and/or characterization is conducted with direct current. In some embodiments, alternating current is used. In some embodiments, alternating and direct current are used in combination, either in serial or in parallel. In some embodiments, optical detection is done with multiple wavelengths. In these embodiments, the technology may comprise multiple excitation sources, filter sets, and detectors. In some embodiments, the electrical detection comprises producing a direct current flow across a region of interest within the microfluidic channel. In some such embodiments, RF current is not simultaneously applied.

Numerous microchannel designs are suitable for detection. In some embodiments, microchannels comprise straight rectangular prism channels, cylindrical channels, or some other geometry channels. Microchannels can comprise zero, one, two, or more than two nodes. Nodes in microchannels comprising nodes can be of any appropriate geometry, for example straight rectangular nodes, cylindrical nodes, or some other geometry. In some embodiments, electrical and optical sensing are both used. In some embodiments, optical sensing using an LED or laser source is followed by electrical sensing. In some embodiments, electrical sensing is followed by optical sensing with an LED or laser source. In some embodiments, electrical and optical sensing are performed simultaneously. In some embodiments, only electrical or optical sensing is performed in a sensing region.

Isolation and Sorting

Upon detection of the one or more particles of interest, pressure is increased on a trigger flow inlet to the channel, causing the one or more detected particles of interest to be diverted into a second, "carrier" channel (see, e.g., FIG. 17). In some embodiments, the carrier channel has no flow unless a particle has been directed into it. In other embodiments, a base level flow is always provided to the carrier channel. In some embodiments, the flow rate is altered after being triggered by detection and/or characterization of a particle in the sensing region.

Isolating droplets form as a result of liquid entering and exiting a dispensing nozzle. Drop size can be modulated by physical properties of the exit channel including nozzle design, nozzle inner orifice diameter, nozzle outer orifice diameter, contact angle, surface coating, hydrophobicity of the channel, and applied vibration. Droplets can range from sub microliter to several microliters (e.g. 50) in common use cases. It is envisioned that isolation droplets could be on the milliliter scale.

Solution that has been sorted is directed to an outlet in the microfluidic chip mold that is connected to a nozzle in the faceplate through a fluid via and fluid channel. In some embodiments, this is done by blocking the default branch of the branch point involving the final carrier microfluidic channel. The increased fluid flow to the selected outlet enables the formation of a droplet containing a single particle at the collection nozzle on the bottom of the interface plate. The droplet may dissociate from the nozzle by gravity, the force of the flow from the selection outlet, or a combination of the two.

The droplet from the nozzle may be directed into any desired collection receptacle. In some embodiments, each individual droplet is deposited into a separate receptacle. In other embodiments, a plurality of droplets are deposited into the same receptacle. In certain embodiments, individual droplets are isolated by depositing each into a separate well of one or more microtiter plates or any other appropriate receptacle. Receptacle plates may have any number of wells including 8, 16, 64, 96, 128, 256, 384, or more than 384 wells. In certain other embodiments, a plurality of droplets, each containing an individual particle, are deposited into the same receptacle and form a solution containing a plurality of particles. In these embodiments, the concentration and/or purity of the selected particles may be increased relative to that of the sample solution loaded into the sample reservoir. In some embodiments, a droplet can contain more than one target particle.

Each droplet can contain different types of particles of interest. Systems described herein can include the ability to detect and actively sort multiple cell phenotypes.

The microfluidic nature of the technology allows for the volume of a single collection droplet to be decreased. Minimizing the volume of the collection droplets increases the probability that a given droplet contains exactly one isolated particle. Carrier channels on the microfluidic scale also decrease the time between detecting and/or characterizing a particle and its collection, thereby increasing the rate of detecting, characterizing, and/or collecting particles in the sample solution.

EXAMPLES

The following specific examples are to be construed as merely illustrative, and not limitative of the remainder of the disclosure in any way whatsoever. Without further elaboration, it is believed that one skilled in the art can, based on the description herein, utilize the present invention to its fullest extent.

Example 1

Sorting of Circulating Tumor Cells from a Blood Sample

Figure 18A:
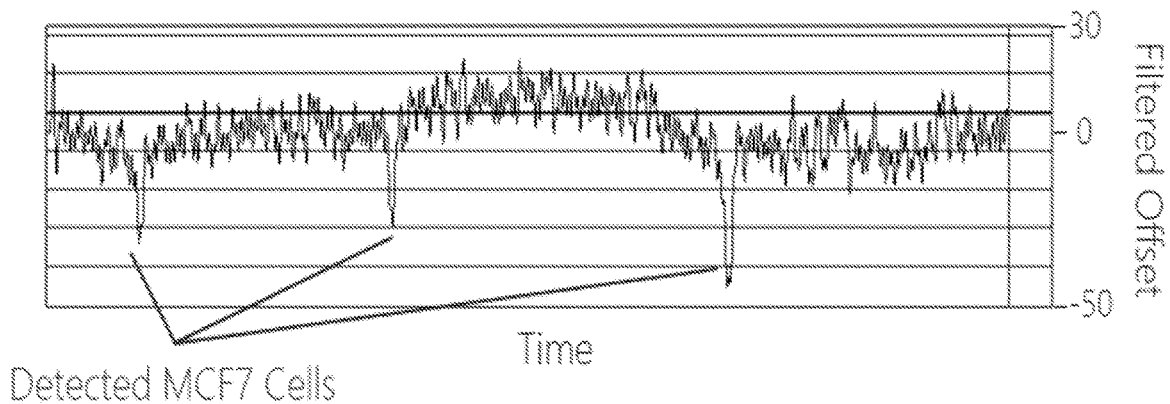
FIGS. 18A-18C are experimental data plots showing cell sorting of circulating tumor cells from a blood sample, according to an example implementation.
Figure 18B:
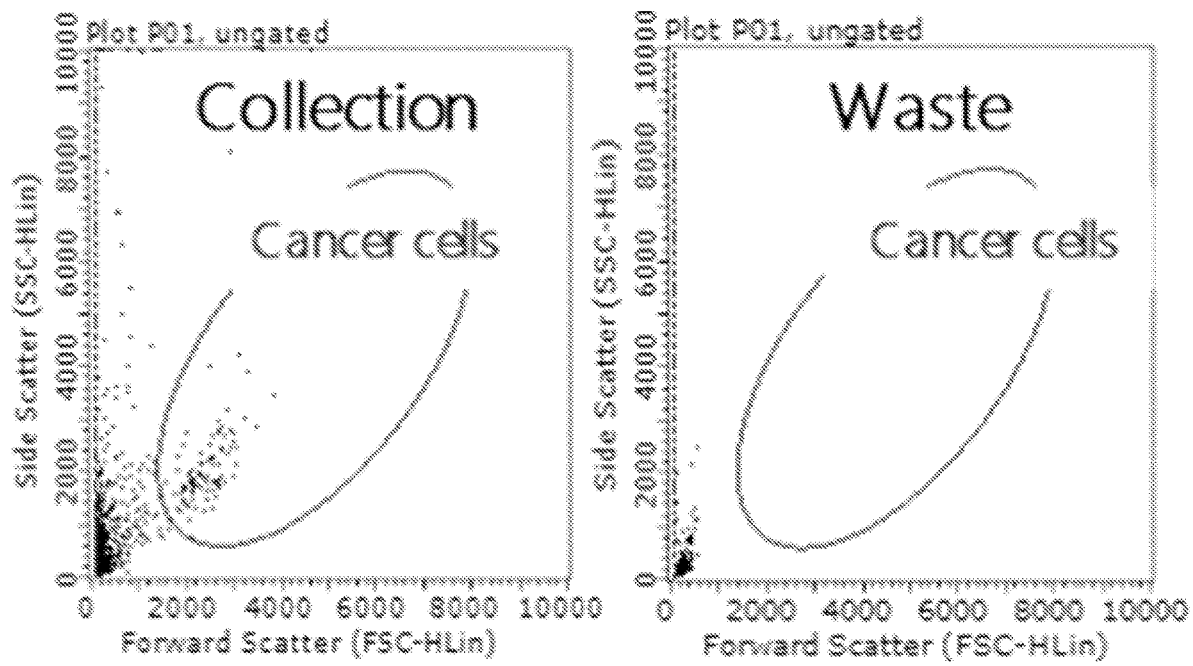
Figure 18C:
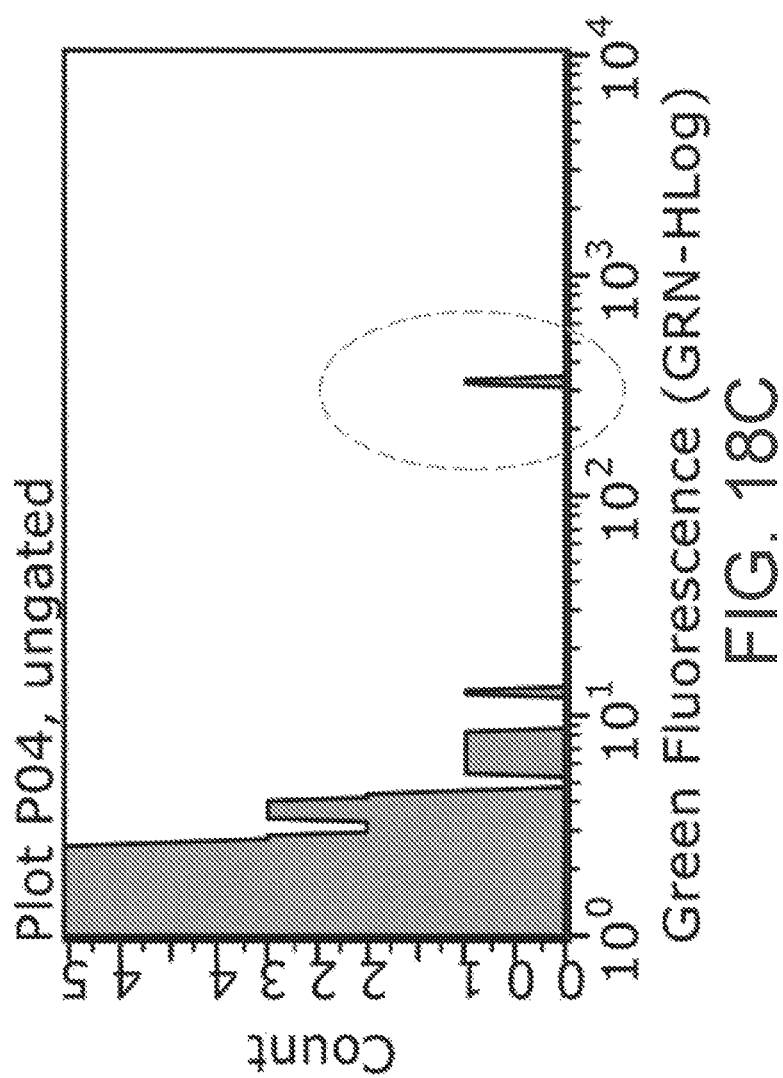

FIGS. 18A-18C show cell sorting of circulating tumor cells from a blood sample. Detection of breast cancer cell line cells, MCF-7 expressing green fluorescent protein (GFP), in a whole blood sample was performed using electrical sensing. Detected MCF-7 cells were sorted away from waste. Breast cancer cell line cells, MCF-7 expressing green fluorescent protein (GFP) were spiked into whole blood at physiologically relevant concentration (near circulating tumor cell concentration) for a total cellular sample concentration of about 10-1000 cells per milliliter. The whole blood/MCF-7-GFP solution was loaded into the sample reservoir. A flow rate of 100 microliters/min was applied to the sample. Cells were characterized by electrical impedance in the microfluidic sensing region. Cells possessing MCF-7-GFP impedance signatures were separated from those that did not exhibit those signatures and collected (FIG. 18A). The final concentration of the detected and collected MCF-7-GFP cells was roughly 100% of the MCF-7-GFP cells in the initial sample. FIG. 18A shows changes in the current in the microfluidic conduit over time as the sample flowed through the microfluidic chip.

Traditional flow cytometry was performed separately on the collected MCF-7-GFP and the waste to confirm correct sorting (FIG. 18B). Forward scattering and side scattering measurements of the MCF-7-GFP collection displayed a number large cells (high forward scattering) with high granularity (high side scattering) indicating cancer cells. In contrast, the Waste collection lacked any large, highly granular cancer cells.

Further confirmation of correct sorting was performed by measuring green fluorescence using traditional fluorescent flow cytometry (FIG. 18C). The collection output contained a number of cells that fluoresced at the GFP wavelength confirming high accuracy sorting by the instant technology. 98% of the MCF-7-GFP cells were correctly identified and recovered from the spiked whole blood sample.

Example 2

Isolation of a Cancer Cell from a Cell Culture Sample

Figure 19A:
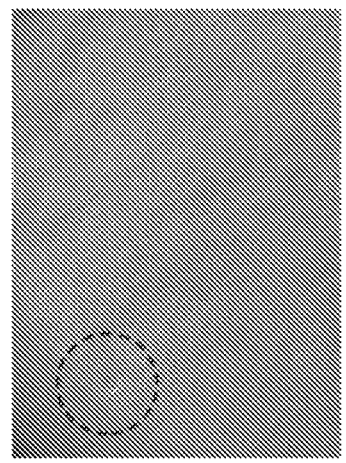
FIGS. 19A-19C are micrographs illustrating cell isolation, according to an example implementation.
Figure 19B:
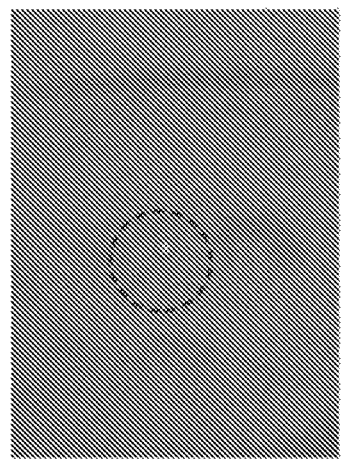
Figure 19C:
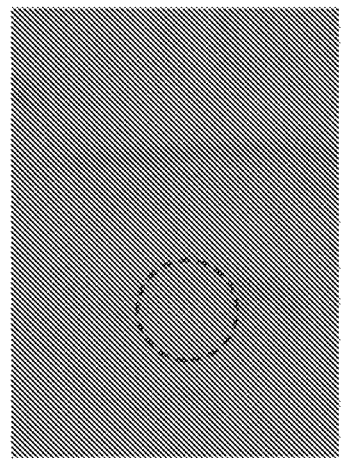

An MCF-7 cell culture was loaded into the sample reservoir at a concentration of 5000 cells per milliliter. A flow rate of 250 µL/min was applied to the sample. Cells were detected by electrical sensing in the microfluidic sensing region. Individual MCF-7 cells were isolated from a sample comprising a plurality of cells and dispensed into single wells of a 96-well plate. Roughly 94% of the wells contained a single cell. The remaining 6% of wells contained no cells or multiple cells. FIGS. 19A-19C show three example single collection wells containing a single, isolated MCF-7 cell.

Example 3

Isolation of a Cancer Cell Using Fluorescence Based Selection

Figure 22A:
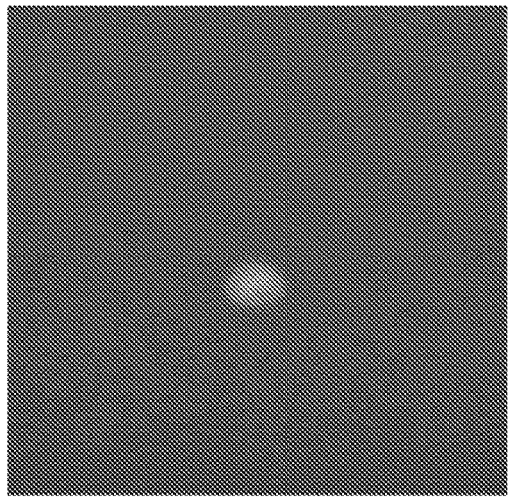
FIGS. 22A-22C are fluorescent micrographs illustrating cell isolation, according to an example implementation utilizing fluorescence based selection.
Figure 22B:
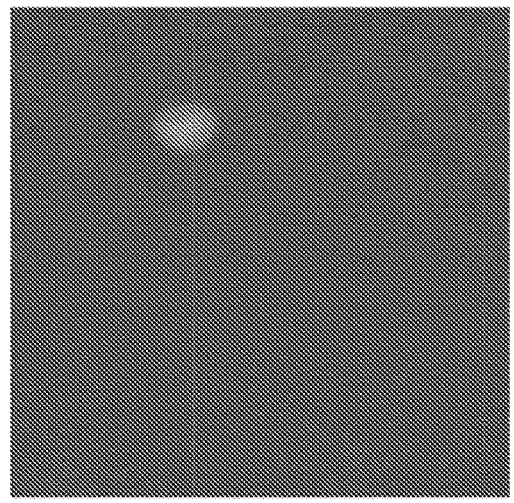
Figure 22C:
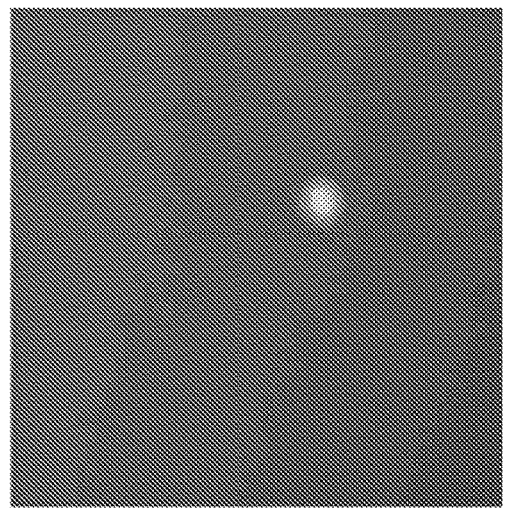

Filtered MCF7-GFP cells (Cell Biolabs cultured in Dulbecco's Modified Eagle Medium (DMEM) with 10% Fetal Bovine Serum (FBS)) were loaded into the sample reservoir at a concentration of 10,000 cells/mL. A flow rate of 100 µL/min was applied, driven by a pressurized air supply. The trigger and carrier fluids were 1× Phosphate Buffered Saline. The microfluidic chip of the system comprised channels fabricated out of cyclic olefin copolymer with a single node in the sensing region. Fluorescent detection of single cells was performed using a 473 nm excitation laser and a photodetector. Single cells were dispensed into a 96-well plate housed on a moving X-Y stage. The X-Y stage shifted to a new well after each detected cell was dispensed. FIGS. 22A-C show fluorescent images of three examples of single collection wells containing a single, fluorescently isolated MCF7-GFP cells.

Example 4

Fluidic Sorting is Independent of Particle Size

Figure 21:
FIG. 21 is a micrograph illustrating that fluidic sorting according to an example implementation is independent of particle size. MCF7 cell clusters isolated using the platform are shown in circled regions.

FIG. 21 depicts MCF7 cell clusters isolated using the platform. Unfiltered MCF7-GFP cells cultured in DMEM with 10% FBS was loaded into the sample reservoir at a concentration of 10,000 cells/mL. A flow rate of 100 µL/min was applied, driven by a pressurized air supply. 1× Phosphate Buffered Saline was used as the trigger and carrier fluids. The microfluidic chip of the system comprised channels fabricated out of cyclic olefin copolymer with a single node in the sensing region. Node-pore sensing was used to selectively gate for larger cell clusters of about 35 microns or larger. A four-point terminal measurement of the current across the node-pores was performed. As cell clusters were identified, trigger fluid was pulsed to allow for the selective collection and isolation of the target clusters.

Example 5

Cells Isolated from a Cell Culture Sample Maintain Their Viability

MCF7-GFP, BC3 (ATCC CRL-2277), or Jurkat Clone E6-1 (ATCC TIB-152) cells were cultured in DMEM with 10% FBS, Roswell Park Memorial Institute (RPMI) 1640 with 20% FBS, or RPMI 1640 with 10% FBS, respectively. MCF7-GFP, BC3, or Jurkat Clone E6-1 samples were loaded into the sample reservoir along with their respective medium at a concentration of 500,000 cells per milliliter. Trigger and carrier fluids were 1× Phosphate Buffered Saline. A flow rate of 100 µL/min driven by a pressurized air supply was applied to the samples. The microfluidic chip of the system comprised channels fabricated out of cyclic olefin copolymer with a single node in the sensing region. Node-Pore Sensing pulses were used for detection and configured to pulse the trigger fluid and allow for isolation of 8-25 microns. As single cells transited through the device, a four-point terminal measurement of the current across the node-pores was performed.

Figure 20:
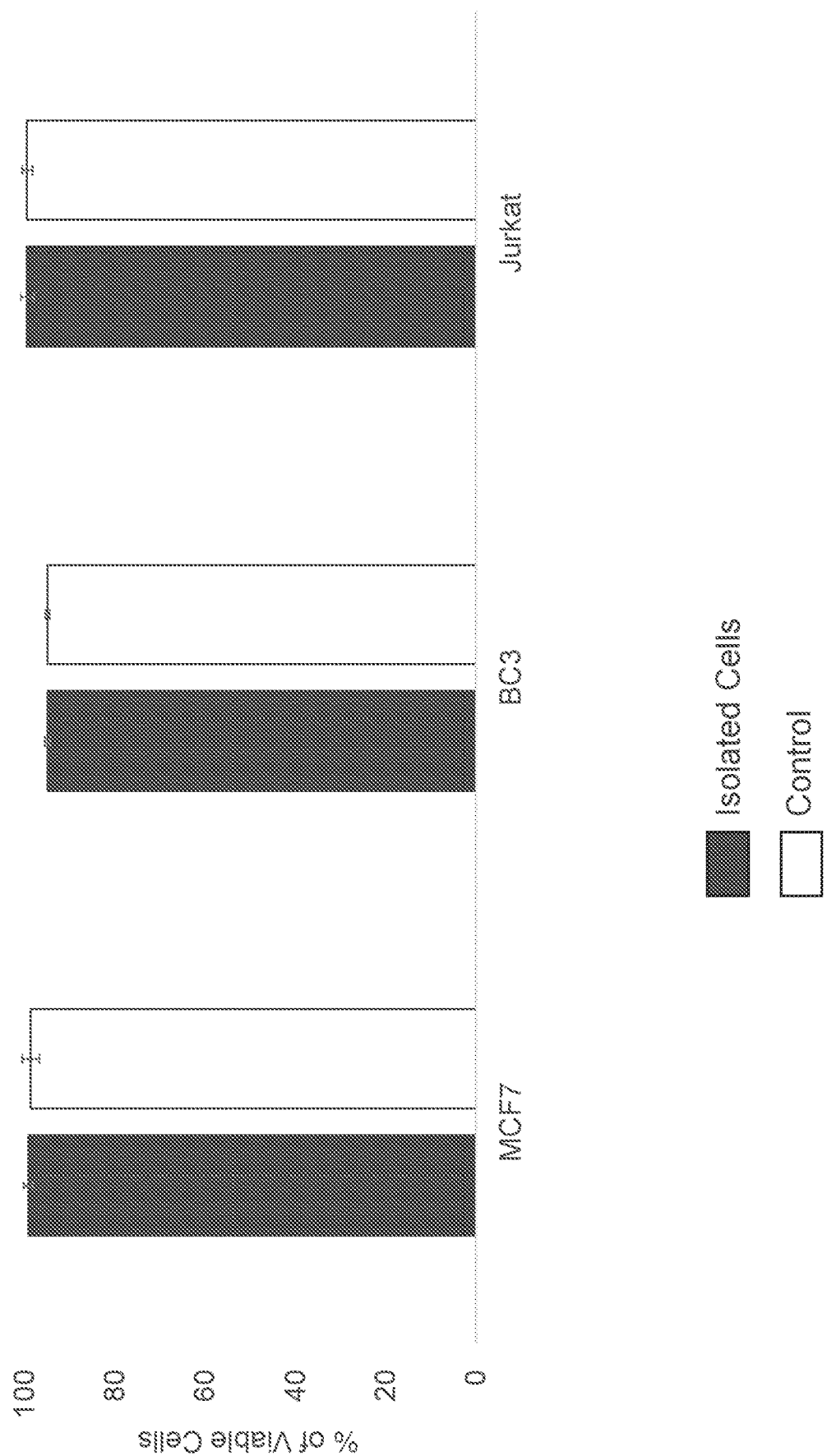
FIG. 20 is an experimental data plot showing the viability of cells sorted according to an exemplary implementation is maintained relative to unsorted cells.

100 µL of collected cell volumes were stained with 100 µL of Tryptan Blue to assess viability for each of the cell types. MCF7-GFP, BC3, and Jurkat Clone E6-1 cells that had not been run through the detection and isolation scheme were taken from the original input sample. These control cell samples were also stained with Tryptan Blue. FIG. 20 depicts the percent viability for both the isolated and control cell samples as analyzed using microscopy.

Example 6

Isolation of Colloids

Colloids of 5 µm, 10 µm, 15 µm, and 20 µm diameters have been detected and isolated.

Example 7

Exemplary Operation

Fill cartridge chambers with respective liquids (e.g., 8 mL of 1× phosphate buffered saline in carrier and trigger fluid chambers, 10,000 MCF7 cells/mL media in sample chamber).

Place cartridge onto instrument baseplate—see valve manifold locations and interface plate design (FIGS. 10A-10B). Auto-alignment ensures 1) positioning of carrier waste routing on interface plate into hole in base plate routing to external microvalve and then back to interface plate toward carrier waste outlet, 2) trigger hole on interface plate routing into hole in base plate routing to external microvalve and then back to interface plate toward trigger inlet, 3) collection/dispensing nozzle positioned over desired collection chamber for drop collection, 4) electrical contact between electrode pads on chip and system electrical contacts, 5) positioning of light bore under LED in top plate.

Clamp cartridge using instrument. This connects pressurized air sources (turned off until beginning of test) with the cartridge chambers.

Pressure can be tuned/retuned using knobs for each of the chambers until desirable fluid switching is achieved (i.e., when external trigger valve is open, sample fluid flows into collection outlet).

Valve on-times, off-times, and dead-times can be set for a desired setting (e.g., when a particle of interest is detected, turn on the external trigger microvalve for 100 milliseconds (this is default off) and close the external carrier microvalve for 5 seconds (this is default open to ensure the majority of carrier fluid is routed to waste and not the collection droplet when there is no detection, and closing the external microvalve ensures that carrier flow only goes through the collection nozzle, thus accelerating the drop creation and detachment once a particle has been detected). The carrier microvalve close time is calibrated with droplet detachment time. The trigger microvalve has a dead time associated with this droplet time as well, i.e., the trigger microvalve will not trigger again until the drop is detached to ensure the drop contains only one target particle if single-particle dispensing is desired. If single-particle per well dispensing is desired, stage movement is calibrated with the droplet timing (i.e., move to next well chamber after waiting for detection of single particle and droplet to detach and fall into the well).

Electrical sensing offset voltages for sensing can be set as desired (larger magnitude for larger pulses, intermediate magnitudes for selection as "gates"). Fluorescent settings can likewise be calibrated (e.g., LED voltage, photodectector/PMT gain, etc.). Thresholds can then be set for proper gating as desired.

Pressurized air is turned on and the test runs to completion.

The collection plate/tube can be removed from the instrument with particles sorted/dispensed.

Example 8

Exemplary System

An exemplary system includes the disposable cartridge shown in FIGS. 2A-2I, the interface plate shown in FIGS. 3A-3F, and the microfluidic chip shown in FIGS. 4A-6G.

The disposable cartridge body has a sample reservoir, a carrier reservoir, and a trigger reservoir. The sample reservoir has a maximum volume of 10 milliliters. Sample containing particles of interest are loaded into the sample reservoir at a volume of 1 microliter or more up to the sample reservoir's maximum volume. The carrier reservoir and the trigger reservoir each have a maximum volume of 5 milliliters. Carrier and trigger fluids are loaded into the carrier and trigger reservoirs each has a volume of 100 microliters or more up to the respective reservoir's maximum volume.

The bottom of the sample reservoir, carrier reservoir, and trigger reservoir each have a fluid inlet aperture of 1/32 inches in diameter. These apertures provide access for fluid in each reservoir to the interface plate attached to the disposable cartridge in the system. The floor of the sample reservoir is sloped such that sample fluid loaded into the sample reservoir accumulates at or proximal to the sample reservoir's aperture.

A light pipe core is positioned in the wall separating the reservoirs and can be seen in FIGS. 2A-2C and FIGS. 2G-2I. The light pipe traverses the cartridge body vertically without contacting the internal volumes of the reservoirs. The light pipe provides passage for emission and excitation wavelengths through the cartridge body to and from the system's microfluidic chip.

The cartridge body has overall dimensions of 54 mm×46 mm×32.4 mm and is machined out of acrylic.

The interface plate of the exemplary system attaches to the bottom of the disposable cartridge body. The bottom of the interface plate includes dispensing nozzles for dispensing sample collection containing particles of interest detected and/or characterized by the system, sample waste, and carrier waste (see, e.g., FIGS. 3A and 3E). The upper side of the interface plate provides channel ways connecting the apertures of the disposable cartridge body to the microfluidic chip inlets and from the microfluidic chip's outlets to the dispensing nozzles on the bottom of the interface plate (see, e.g., FIGS. 3C and 3D). The upper side of the interface plate contains channel ways 312 that connect the sample and control reservoirs of the cartridge body through the reservoirs' apertures to the baseplate through holes on the bottom of the interface plate. Connection to the baseplate allows for external valving. The bottom of the interface plate also has bonding ridges to ensure proper attachment of the interface plate with the microfluidic chip (see, e.g., FIG. 3F). Through the center of the interface plate is a hole that aligns with the light pipe in the cartridge body and allows light to traverse the interface plate to and from the microfluidic chip.

The interface plate has overall dimensions of 54 mm×46 mm×4.3 mm and is machined out of polycarbonate. It is adhered to the bottom of the cartridge body via a pressure sensitive adhesive.

The microfluidic chip includes a microfluidic chip substrate and a microfluidic chip mold (FIGS. 4A-6G). The microfluidic chip substrate comprises electrodes made of a copper adhesion layer with a platinum top layer. The electrodes are provided electrical current and serve as electrical contacts for sensing and detecting particles in the sensing region. The microfluidic chip mold comprises microchannels where particles are sensed, detected, characterized, sorted, and/or isolated.

The microchannel geometry is shown in FIGS. 4A-4B. Fluid from the sample reservoir, provided passage through the interface plate, enters the microfluidic chip through the sample inlet. The particles in the sample fluid are advanced through a microchannel with a 0.35 mm diameter to the sensing region. Inside the sensing region is a node with a diameter of 0.105 mm. On either side of the node in the sensing region the microchannel has a diameter of 0.035 mm. As a particle passes through the sensing region it is electrically detected and/or characterized using the microfluidic substrate's electrodes. The sensing region is also aligned with the light pipe in the interface plate and the cartridge body, such that a particle passing through the sensing region is exposed to an excitation wavelength, and emission wavelengths from the particle are detectable and/or characterizable.

The microfluidic channel exiting the sensing region has a diameter of 0.35 mm and intersects with a microchannel from the trigger inlet. The trigger inlet is provided a flow of trigger fluid from the trigger reservoir through the interface plate. Dependent upon the sensing and/or characterization signal, a flow is provided from the trigger inlet to direct or route the particle in the first intersection. In the absence of the trigger flow, the particle travels to the sample waste outlet and is dispensed through the connected output nozzle in the interface plate. Upon the application of the trigger flow, the particle is directed to a microchannel that intersects with a microchannel from the carrier inlet. The carrier inlet is provided a flow of carrier fluid from the carrier reservoir through the interface plate. A valve controls the flow of carrier fluid into the carrier waste outlet. When the valve is open, the fluid in the second intersection is preferentially directed to the carrier waste and is dispensed through the connected output nozzle in the interface plate. When the valve is closed in response to the signal or signal change measured in the sensing region, the fluid and the detected and/or characterized particle is directed to the sample collection outlet. The sample collection outlet is connected to the third nozzle in the interface plate where particles are dispensed for collection.

Both the mold and the substrate are composed of plastic 1/32 inches thick and are bonded together through a combination of heat, lamination, and solvent.

An assembly of the cartridge is shown in FIGS. 7A-8I and the assembly is shown in relation to an exemplary subsystem including an optical source, top plate, base plate, and collection module in FIG. 13.

What is claimed is:

1. A particle sorter and isolating cartridge, comprising:
   a microfluidic chip comprising:
   a sensing or detector region;
   a sorting region;
   a first microfluidic channel having a first side and a second side and carrying a particle flow through the sensing or detector region and the sorting region;
   a trigger channel having an outlet on the first side of the first microfluidic channel and being in fluidic communication with the first microfluidic channel at the sorting region;
   a second microfluidic channel having an inlet on the second side of the microfluidic channel and being in fluidic communication with the first microfluidic channel at the sorting region, wherein an upstream edge of the inlet of the second microfluidic channel is substantially aligned with an upstream edge of the outlet of the trigger channel and wherein the second microfluidic channel is at a non-right angle to the first microfluidic channel;
   a third microfluidic channel that is fluidically and operably coupled to the second microfluidic channel,
   wherein the particle sorter and isolating cartridge is configured such that, upon detection of a target particle in the particle flow within the sensing or detector region, a trigger flow from the outlet of the trigger channel diverts the target particle from the particle flow in the first microfluidic channel into the inlet of the second microfluidic channel and the target particle continues to flow from the second microfluidic channel into the third microfluidic channel for subsequent collection.

2. The particle sorter and isolating cartridge of claim 1, wherein the microfluidic chip is disposable.

3. The particle sorter and isolating cartridge of claim 1 further comprising a body, wherein the body defines a plurality of reservoirs therein, and wherein the plurality of reservoirs includes one or more of a sample reservoir, a control fluid reservoir, or a trigger reservoir.

4. The cartridge of claim 3, wherein the plurality of reservoirs includes the trigger reservoir, and wherein the trigger flow comprises fluid from the trigger reservoir.

5. The particle sorter and isolating cartridge of claim 3 further comprising an interface plate, wherein the interface plate is configured to connect to the body, and wherein the interface plate is configured to connect to the microfluidic chip.

6. The particle sorter and isolating cartridge of claim 5, wherein one or more of the microfluidic chip, the body, or the interface plate are disposable.

7. A particle sorting and isolating system, comprising:
a base plate; and
a cartridge assembly, the base plate configured to receive and connect to the cartridge assembly;
the cartridge assembly including:
a microfluidic chip comprising:
a sensing or detector region;
a sorting region;
a first microfluidic channel having a first side and a second side and carrying a particle flow through the sensing or detector region and the sorting region;
a trigger channel having an outlet on the first side of the first microfluidic channel and being in fluidic communication with the first microfluidic channel at the sorting region;
a second microfluidic channel having an inlet on the second side of the microfluidic channel and being in fluidic communication with the first microfluidic channel and positioned at a non-right angle with respect to the particle flow at the sorting region, wherein an upstream edge of the inlet of the second microfluidic channel is substantially aligned with an upstream edge of the outlet of the trigger channel and wherein the second microfluidic channel is at a non-right angle to the first microfluidic channel; and
a third microfluidic channel that is fluidically and operably coupled to the second microfluidic channel
wherein the cartridge assembly is configured such that upon detection of a target particle in the particle flow within the sensing or detector region, a trigger flow from the outlet of the trigger channel diverts the target particle from the particle flow within the first microfluidic channel into the inlet of the second microfluidic channel and the target particle continues to flow from the second microfluidic channel into the third microfluidic channel for subsequent collection.

8. The particle sorting and isolating system of claim 7, wherein the microfluidic chip is disposable.

9. The particle sorting and isolating system of claim 7, further comprising one or more detectors configured to be operably coupled to the sensing or detector region, and wherein each of the one or more detectors is independently an electrical detector or an optical detector.

10. The particle sorting and isolating system of claim 9, wherein at least one of the one or more detectors is the electrical detector, and wherein the detector is configured to detect the target particle in the sensing or detector region.

11. The particle sorting and isolating system of claim 9, wherein at least one of the one or more detectors is the optical detector, and wherein the detector is configured to detect the target particle in the sensing or detector region.

12. The particle sorting and isolating system of claim 7 further comprising a body, wherein the body defines a plurality of reservoirs, and wherein the plurality of reservoirs includes one or more of a sample reservoir, a control fluid reservoir, or a trigger reservoir.

13. The particle sorting and isolating system of claim 12, wherein one or more of the microfluidic chip or the cartridge body are disposable.

14. The system of claim 12, wherein the plurality of reservoirs includes the trigger reservoir, and wherein the trigger flow comprises fluid from the trigger reservoir.

15. The system of claim 14, wherein the trigger flow is gated by valving.

16. The system of claim 15, wherein the valving is external to the cartridge assembly.

17. The system of claim 12, wherein the plurality of reservoirs includes the control fluid reservoir, and wherein the carrier flow comprises fluid from the control fluid reservoir.

18. The system of claim 17, wherein the carrier flow is gated by valving.

19. The system of claim 18, wherein the valving is external to the cartridge assembly.

20. A method for sorting and isolating a target particle, the method comprising: providing the particle sorting and isolating system of claim 7, accepting a sample comprising a plurality of particles into the cartridge assembly, detecting the target particle by one or more of an optical signal or an electrical signal generated by the target particle as the target particle passes through the sensing or detector region,
sorting and isolating the target particle based on the optical signal or electrical signal through application of the trigger flow to divert the target particle into the inlet of the second microfluidic channel such that the target particle continues to flow from the second microfluidic channel into the third microfluidic channel, and
depositing a droplet comprising the target particle into a collection receptacle at a distal end of the third microfluidic channel, wherein the depositing occurs after the target particle has been sorted and isolated.

21. The method of claim 20, wherein the detecting step involves simultaneous optical and electrical signals.

22. The method of claim 21, wherein the detecting step comprises measuring the velocity of the target particle traversing the sensing or detector region.

23. The method of claim 22, wherein the target particle is exposed to an excitation wavelength as the target particle passes through the sensing or detecting region, and further comprising a step of increasing the velocity of the target particle as it passes through the sensing or detecting region such that the total time of exposure to the excitation wavelength is less than 100 milliseconds.

24. A method for sorting and isolating a target particle, the method comprising:
flowing a particle solution comprising a plurality of particles through a first microchannel having a first side and a second side and comprising a sensing or detector region and a sorting region, the sorting region comprising an inlet of a second microfluidic channel located on the second side of the first microfluidic channel and an outlet of a trigger channel located on the first side of the first microfluidic channel, wherein an upstream edge of the inlet of the second microfluidic channel is substantially aligned with an upstream edge of the outlet of the trigger channel and wherein the second microfluidic channel is at a non-right angle to the first microfluidic channel;
detecting the target particle as the target particles passes through the sensing or detector region;
diverting the target particle from the flow of particle solution in the first microfluidic channel into the inlet of the second microfluidic channel at the sorting region by application of a trigger flow from the outlet of the trigger channel upon detection of the target particle in the sensing or detector region to sort and isolate the target particle; and depositing a droplet comprising the target particle into a collection receptacle at a distal end of a third microfluidic channel that is fluidically and operably coupled to the second microfluidic channel, wherein the depositing occurs after the target particle has been sorted and isolated.

25. The method of claim 24, wherein detecting is by at least one of an optical signal or an electrical signal generated by the target particle as the target particle passes through the sensing or detector region of the microchannel.

* * * * *